United States Patent [19]
Ueda

[11] Patent Number: 5,212,557
[45] Date of Patent: May 18, 1993

[54] IMAGING DEVICE CAPABLE OF CARRYING OUT AUTOMATIC FOCUSING WITH STABLE DETECTION ACCURACY AND AT A HIGH RESPONSE SPEED

[75] Inventor: Kazuhiko Ueda, Yokohama, Japan

[73] Assignee: Victor Company of Japan, Ltd., Yokohama, Japan

[21] Appl. No.: 752,361

[22] Filed: Sep. 3, 1991

[30] Foreign Application Priority Data

| Aug. 31, 1990 [JP] | Japan | 2-229802 |
| Aug. 31, 1990 [JP] | Japan | 2-229803 |
| Nov. 6, 1990 [JP] | Japan | 2-300416 |

[51] Int. Cl.$^5$ .......................................... H04N 5/232
[52] U.S. Cl. ..................... 358/228; 358/227
[58] Field of Search ............. 358/227, 228, 209; 250/201.6, 201.2, 201.4; 354/404, 402

[56] References Cited

U.S. PATENT DOCUMENTS

| 4,762,986 | 8/1988 | Suda et al. | 250/201 |
| 4,804,831 | 2/1989 | Baba et al. | 250/201 |
| 4,969,044 | 11/1990 | Hijikata et al. | 358/227 |
| 5,005,086 | 4/1991 | Iwamoto et al. | 358/227 |
| 5,055,932 | 10/1991 | Hijikata et al. | 358/227 |

FOREIGN PATENT DOCUMENTS

| 0341692 | 11/1989 | European Pat. Off. |
| 0382222 | 8/1990 | European Pat. Off. |
| 62-272217 | 11/1987 | Japan |
| 62-272218 | 11/1987 | Japan |
| 63-26082 | 2/1988 | Japan |
| 63-59274 | 3/1988 | Japan |
| 63-88533 | 4/1988 | Japan |

OTHER PUBLICATIONS

Abstracts of Japan, vol. 14, No. 194 (E-0919), Apr. 20, 1990; & JP-A-2 039 779 (Canon Inc.) 08-02-1990.
Abstracts of Japan, vol. 15, No. 246 (E-1081), Jun. 24, 1991; & JP-A-3 077 481 (Canon Inc.) 03-04-1991.
Abstracts of Japan, vol. 12, No. 281 (E-641), Aug. 2, 1988; & JP-A-63 059 274 (Victor Co. of Japan) 15-03-1988.

Primary Examiner—Herbert Goldstein
Assistant Examiner—Tuan V. Ho
Attorney, Agent, or Firm—Jacobson, Price, Holman & Stern

[57] ABSTRACT

An automatic focusing imaging device basically comprises an imaging element for applying photoelectric conversion to an image pick-up light from an object formed by a lens system, an extraction circuit for extracting, as an analog signal, a high frequency band component of the video signal, an analog/digital (A/D) conversion circuit for converting the extracted analog signal to a digital signal, a calculation circuit responsive to the digital signal to calculate in advance an in-focus position in the lens system and the imaging element so that the high frequency band component has a maximum level to generate a control signal, a drive mechanism for moving the lens system and/or the imaging element by the control signal, and a non-linear conversion circuit provided at the preceding stage of the A/D conversion circuit and for correcting in advance deterioration of quantization resolution of the high frequency band component in calculation of the in-focus position.

9 Claims, 17 Drawing Sheets

IMAGING DEVICE CAPABLE OF CARRYING OUT AUTOMATIC FOCUSING WITH STABLE DETECTION ACCURACY AND AT A HIGH RESPONSE SPEED

BACKGROUND OF THE INVENTION

This invention relates to an imaging device with automatic focusing function used in a video camera, etc., and more particularly to an imaging device capable of carrying out an automatic focusing with a stable detection accuracy and at a high response speed irrespective of the distance from an in-focus position of a principal object, the intensity of a secondary object, and the kind of illumination at the place where an object is positioned, etc.

FIG. 1 shows a schematic block diagram of a conventional automatic focusing imaging device using the hill-climbing method. This device is provided with an optical system 3 comprised of an afocal system lens 1 and a focusing lens 2, thus to carry out focusing by moving the focusing lens 2 in an optical axis direction.

Further, an image pick-up light from an object incident through the optical system 3 undergoes photoelectric conversion at an image pick-up element 4 such as a CCD (Charge Coupled Device), etc. to provide an electric video signal $S_v$.

Then, this video signal $S_v$ is amplified at an amplifier 5 and is delivered to a recording circuit (not shown), and is also delivered to a band-pass filter (BPF) 6.

This band-pass filter 6 extracts a high frequency component at the central portion of a pictorial image from the video signal $S_v$ to deliver it to a detector (DET) 7, at which a focal point voltage E corresponding to the high frequency component of the video signal $S_v$ is taken out.

This focal point voltage E corresponds to sharpness of a reproduced pictorial image of the video signal $S_v$. When the focusing lens 2 is at the in-focus position P, the focal point voltage E takes a maximum focal point voltage $E_{max}$.

The focal point voltage E is then digitalized at an A/D converter 8, and focal point voltage thus digitalized is delivered to a calculation processing circuit 9.

This calculation processing circuit 9 is of a structure to take thereinto the digitalized focal point voltage E every each field to generate a control signal on the basis of this data to operate drive means 10 by this control signal to move the focusing lens 2 so that it is placed at the in-focus position.

In the calculation processing circuit 9, calculation is performed in accordance with the following equation showing a focal point voltage at an in-focus position:

$$E_{max} = b = \frac{E(x)}{e^{-(\Delta P)2}}$$

where b is a coefficient equal to $E_{max}$, $\Delta P$ is a distance up to an in-focus position, and $E(x)$ is a focal point voltage at an arbitrary time point.

Further, calculation for determining distance $\Delta P$ up to the in-focus position is performed in accordance with the following equation:

$$\Delta P = \frac{\log \frac{E(x)}{E(x+m)}}{2a^2 m} - \frac{1}{2a^2}$$

where a is a coefficient for determining the value of the focal point voltage E, and is a quantity of movement for one field time period of the focusing lens. Further, the value of a is determined as a function of a focal length of the lens, a frequency fc (frequency of the filter for extracting a high frequency component) of an object, and a F-value of the lens, etc. and is expressed by the following equation:

$$a = K \frac{fc}{F}$$

where K is a value peculiar to the lens.

Information relating to the above-mentioned fc, K and F are delivered to the calculation processing circuit 9, at which the value of a is determined.

Namely, the calculation processing circuit is of a structure to calculate logarithm of a value obtained by dividing a focal point voltage $E(x)$ at an arbitrary time point by a focal point voltage $E(x+m)$ after one field time period has passed to immediately determine a distance $\Delta P$ up to the in-focus position of the focusing lens 2 at this time, thus making it possible to predict an in-focus position (P) of the climbing curve from a foot position $(x+m)$ of the mountain as shown in FIG. 2(a).

Meanwhile, in accordance with the previously described automatic focusing device, a focal point voltage from the detector 7 is quantized by the A/D converter 8. This input/output characteristic becomes a step characteristic having equidistant quantization step widths as shown in FIG. 2(b), for example.

This step signal undergoes logarithmic conversion in the calculation processing circuit 9 in order to determine the above-described $\Delta P$. Thus, the characteristic of the output versus the input of the A/D converter becomes a characteristic as shown in FIG. 2(c).

As shown in FIG. 2(c), particularly according as the level lowers, the step width becomes broad.

This means that, in the climbing voltage curve of FIG. 2(a), according the position becomes close to the foot of the mountain, the step width of the quantization level becomes broad, so the detection accuracy becomes poor.

Accordingly, since an approach is employed to predict the summit (in-focus position) of the climbing curve to carry out automatic focusing, the focal point speed can be advantageously determined, but there was the problem that the focusing accuracy becomes poor in the case of predicting the summit (in-focus position) in the vicinity of the foot of the mountain.

Further, in the conventional other automatic focusing device, in the case of picking up an image of an object, detection of a focus is carried out by a focus detection window 12 provided at the central portion of an imaging frame 11 as shown in FIG. 3A.

Accordingly, in the case where a principal object 13 deviates from the focus detection window 12 as shown in FIG. 3B, there was the problem that automatic focusing is erroneously operated.

Further, in order to prevent such an erroneous operation, as disclosed in the Japanese Patent Application Laid Open No. 126976/85, for example, two large and small focus detection windows are provided at the central portion of a screen whereby when a principal object deviates from the small focus detection window, so the focus voltage lowers, the small focus detection window is switched to the large focus detection window to carry out auto focusing by the large focus detection window if the focus voltage is above a prescribed voltage.

However, also in this case, only a principal object is not necessarily included in the large focus detection window. If the contrast of any other object is higher than that of the principal object, automatic focusing was disadvantageously erroneously operated.

Furthermore, there is an automatic focusing imaging device different from the above-described two conventional devices.

Hitherto, there is known an automatic focusing device to take out, as a focal point voltage, a quantity of high frequency band components of a video signal obtained by picking up an image of an object to move a focusing member such as an imaging element or a focusing lens, etc. so that the focal point voltage becomes maximum.

However, this auto focusing device has the problem that, e.g., at the time of picking up an image under a fluorescent lamp, the focusing operation becomes unstable by the flicker component.

The ON/OFF period of a fluorescent lamp lighted, e.g., at a power supply frequency of 50 Hz is 1/100 seconds. An image picked up, by a camera having a vertical scanning frequency of 60 Hz, an image illuminated by this fluorescent lamp corresponds to the case where a signal of 100 Hz is sampled at 60 Hz. In this case, a component of 20 Hz is generated.

This component is so called "fluorescent lamp flicker".

To improve this, as disclosed in the Japanese Patent Application Laid Open No. 59274/88, for example, there is proposed an automatic focusing device to extract a luminance signal from a video signal to divide the above-described high frequency band component by this luminance component to thereby provide a focal point voltage from which the flicker component is removed to allow the device to carry out focusing on the basis of this focal point voltage, thereby permitting a stable focusing operation free from bad influence by the flicker.

In the conventional focusing device, since focus is generally detected at the central portion of the image pick-up frame, a person who picks up an image positions a principal object at the central portion within the image pick-up frame to pick up an image, thereby allow the principal object to be in focus. However, in the case where a principal object deviates from the central portion of the image pick-up frame, the automatic focusing device may be erroneously operated. To prevent this, there is proposed such an automatic focusing device to arbitrarily move the measurement window within the image pick-up frame so that the high frequency band component becomes large, or to divide the area within the image pick-up frame into a plurality of blocks to determine an optimum focusing position (the position where the principal object is in focus) of the entirety of the image pick-up frame on the basis of focus information of respective blocks (see Japanese Patent Application Laid Open No. 284181/89).

In the above-mentioned automatic focusing device adapted to carry out the focusing operation on the basis of information of the high frequency band component taken out from the distance measurement window changeable within the image pick-up frame, if the means for eliminating the influence by the flicker as disclosed in the above-described Japanese Patent Application Laid Open No. 59274/88, the problem as described below would occur.

Namely, while the high frequency band component is taken out from the distance measurement window which is only a portion of the image pick-up frame changeable in dependency upon movement of the principal object, the luminance component corresponding to the entirety of the image pick-up frame is taken out. An employment of such an approach results in the fact that the high frequency band component taken out from the distance measurement window is divided by the luminance component taken out from the entirety of the image pick-up frame to thereby eliminate the flicker component. Thus, an optimum flicker elimination corresponding to the changeable distance measurement window cannot be carried out, so the focusing operation would be erroneously operated.

Further detailed discussion will be conducted in connection with this. For example, in the case where an image is picked up within a room under a fluorescent lamp where a light having no flicker component like a sun light is admitted from a window, let consider within the same screen the case where a principal object is present under the fluorescent lamp and the case where a principal object is present near the window. The distance measurement window is positioned both at the portion below the fluorescent lamp and the portion near the window in correspondence with the principal object. A high frequency component is taken out from the distance measurement window to carry out focusing operation in order to allow the principal object to be in focus. In this focusing operation, although the manner of occurrence of flickers vary in dependency upon whether the principal object is present at the position below the fluorescent lamp or at the position near the window, since a flicker component of the high frequency component is eliminated by using a luminance signal taken out from the entirety of the image pick-up frame, the processing for eliminating the same quantity of flickers is carried out. As a result, an optimum flicker elimination corresponding to respective positions of the changeable distance measurement window cannot be conducted, so the focusing operation would be erroneously operated.

SUMMARY OF THE INVENTION

A first object of this invention is to provide an automatic focusing imaging device capable of detecting, with a high accuracy, even an object present at a position having a low quantization level spaced from an in-focus position.

A second object of this invention is to provide an automatic focusing imaging device free from an erroneous operation and having a high in-focus speed.

A third object of this invention is to provide an automatic focusing imaging device adapted to carry out a focusing operation on the basis of information of a high frequency component taken out from an arbitrary measurement window changeable within an image pick-up frame wherein the device is capable of securely preventing the influence of flickers thus to carry out a stable focusing operation at all times.

To attain the above-mentioned first object, an automatic focusing device according to this invention comprises an imaging element for applying photoelectric conversion to an image pick-up light from an object formed by a lens system to provide a video signal, an extraction circuit for extracting a high frequency component of the video signal as an analog signal, an analog/digital (A/D) conversion circuit for converting the extracted analog signal to a digital signal, a calculation circuit responsive to the digital signal to calculate in advance an in-focus position in the lens system and the image pick-up element so that the high frequency band component becomes a maximum level to generate a control signal, a drive mechanism for moving the lens system and/or the imaging element by the control signal, and a non-linear conversion circuit provided at the preceding stage of the A/D conversion circuit to correct in advance deterioration of the quantization resolution of the high frequency component in calculation of the in-focus position.

By employing the above-described configuration, the non-linear conversion circuit corrects in advance the high frequency component of the video signal to output a corrected analog signal to the A/D conversion circuit. The A/D conversion circuit converts the analog signal of the high frequency component corrected by the non-linear conversion circuit to a digital signal. Thus, deterioration in the quantization in the A/D conversion is prevented. As a result, the accuracy when the calculation circuit calculates an in-focus position is improved. Thus, precise focusing can be carried out.

Further, the automatic focusing imaging device for attaining the above-described second object is of a structure such that the calculation circuit adapted to calculate in advance the in-focus position to output a control signal divides the high frequency component into signal components in a plurality of blocks on a screen to calculate in-focus values, within respective blocks, on the basis of high frequency component information corresponding to the respective blocks to determine an in-focus value of the entirety of the screen on the basis of calculated results of the respective blocks to generate the control signal so as to apply focusing to the principal object on the basis of the determined in-focus position. Further, this device includes a detection circuit for detecting focal point depth information of the lens system to output it to the calculation circuit wherein the calculation circuit is of a structure to calculate an in-focus value on the basis of both the high frequency component information corresponding to respective blocks and the focal point depth information.

Since this automatic focusing imaging device is constructed above, automatic focusing operation can be speedily carried out. Further, even in the case where a principal object within a screen moves, or the case where other objects have a contrast higher than that of the principal object, there does not take place an erroneous operation such that focusing with respect to the principal object deviates. In addition, by detecting the focal point depth information by the detection circuit, many parameters can be utilized. Thus, more accurate focusing can be conducted accordingly.

Finally, the automatic focusing imaging device for attaining the third object comprises a component extraction circuit for extracting a high frequency component and a low frequency band component of a video signal through the same distance measurement window adapted so that the measurement region can be arbitrarily changed within an image pick-up frame, a calculation circuit for calculating the extracted high and low frequency components to provide high frequency component information from which a flicker component is eliminated to output the high frequency component informations, and a drive mechanism for moving the lens system and/or the imaging element on the basis of the high frequency component information from which the flicker component is eliminated so that they are located at an in-focus position.

By employing the above-described configuration, the calculation circuit calculates a flicker component in a video signal detected through the distance measurement window on the basis of the extracted high and low frequency components to calculate high frequency component information from which the flicker component is eliminated to output it. Thus, even if the same distance measurement window changes the measurement region, it is possible to optimumly eliminate the flicker component included in the high frequency component in correspondence with such a change. Thus, prompt response and precise in-focus operation can be attained.

DETAILED DESCRIPTION OF THE PREFERRED EMBODIMENTS

Preferred embodiments of this invention will now be described in detail with reference to the attached drawings.

Figure 1:
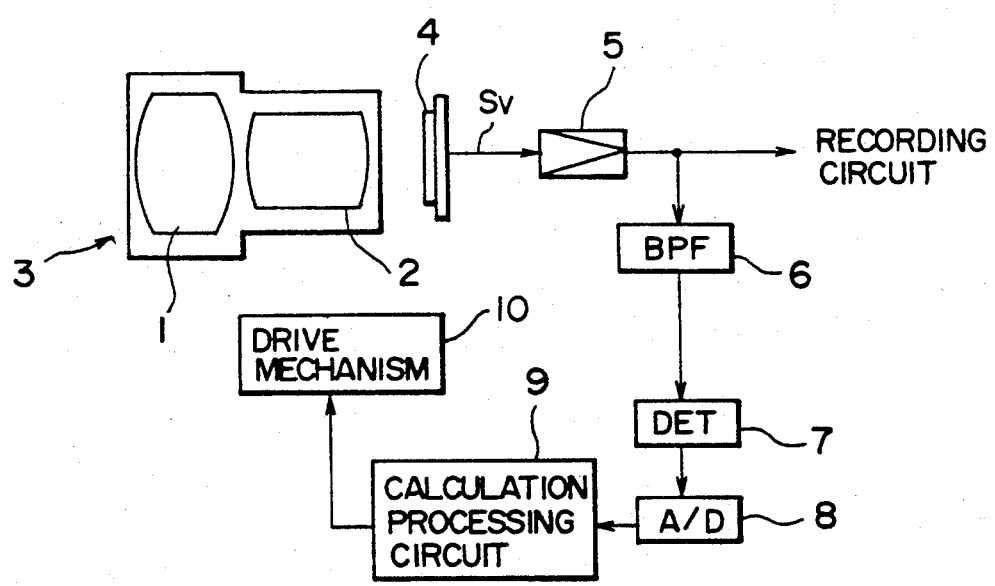
FIG. 1 is a block diagram showing the outline of the configuration of a conventional automatic focusing imaging device.
Figure 2:
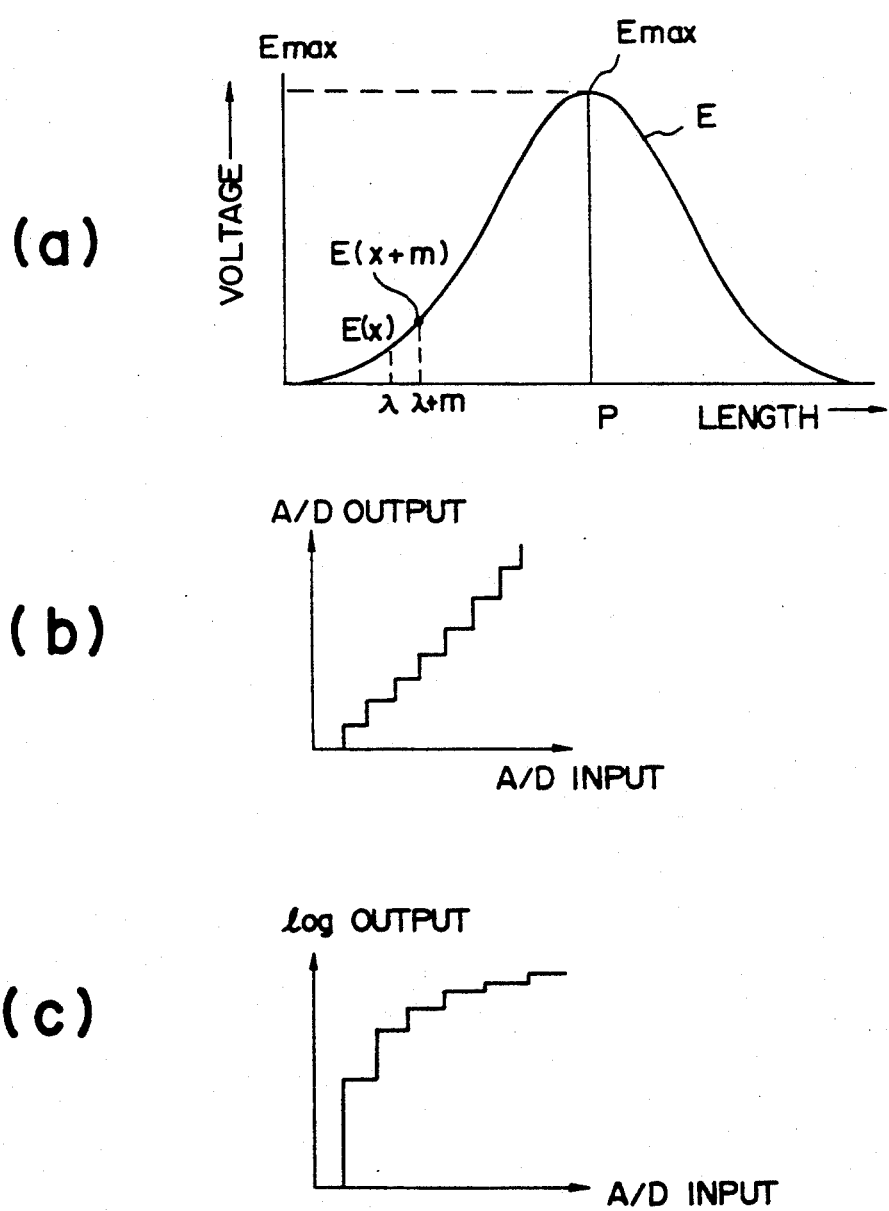
FIG. 2 is a graph for explaining the characteristic of the imaging device shown in FIG. 1 wherein (a) is a graph showing a focal point voltage curve, (b) is a graph showing the relationship between A/D input and A/D output, and (c) is a graph showing the relationship between A/D input and log output.
Figure 3A:
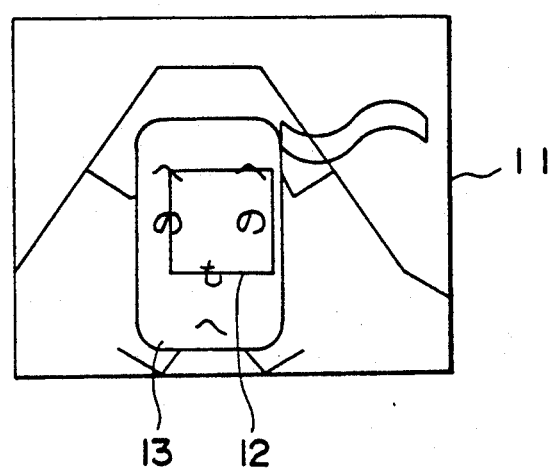
FIG. 3A and 3B are explanatory views showing imaging frames of conventional different type automatic focusing imaging devices, respectively.
Figure 3B:
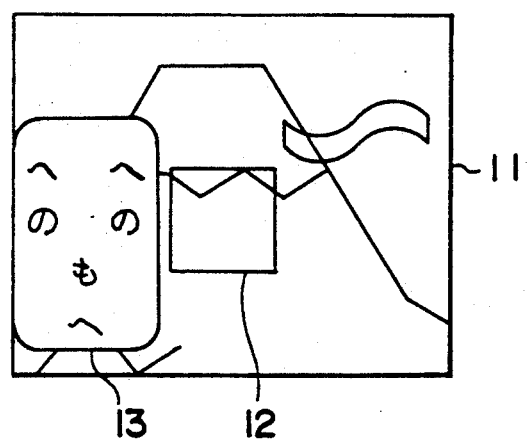
Figure 4:
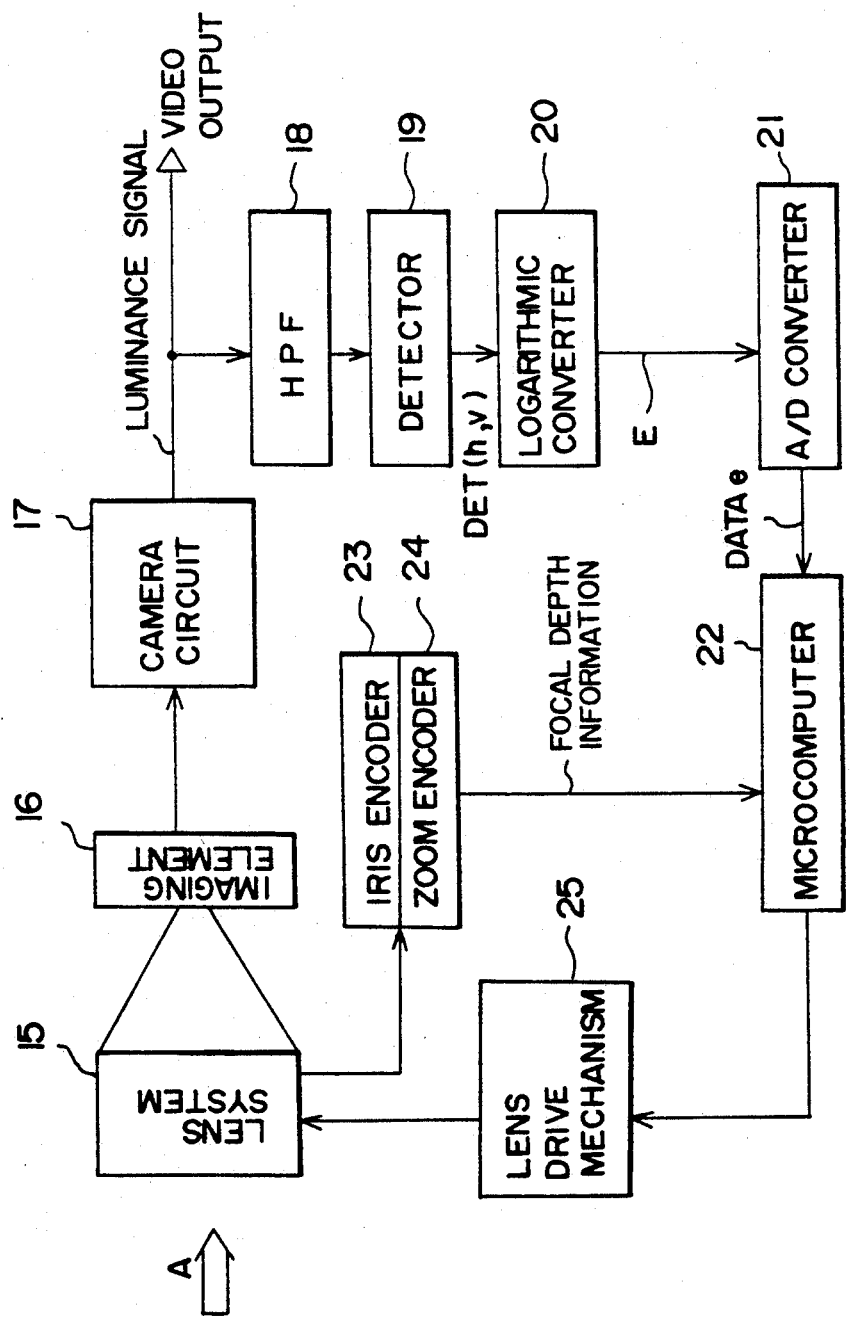
FIG. 4 is a block diagram showing the outline of the configuration of an automatic focusing imaging device according to a first embodiment of this invention.
Figure 5:
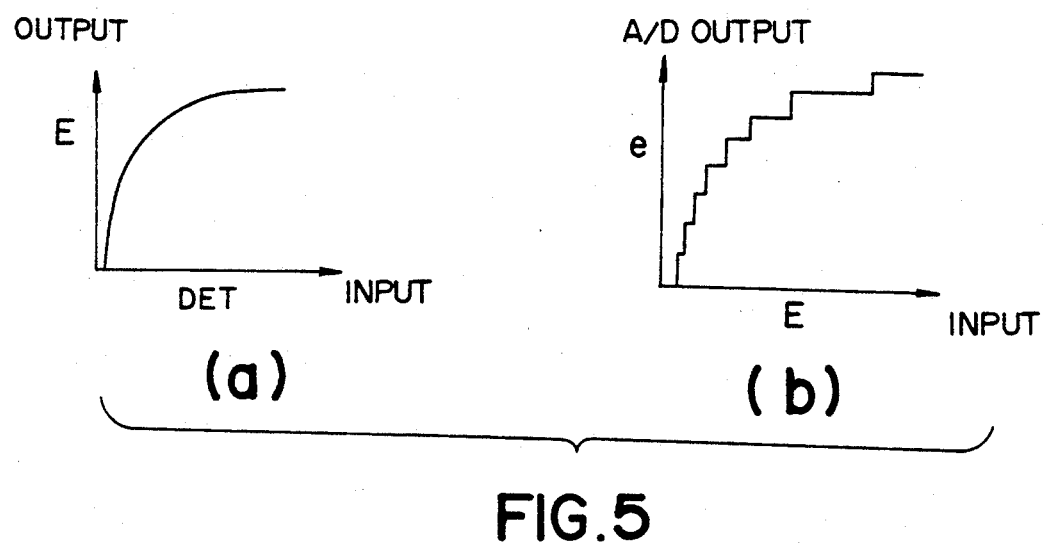
FIG. 5 is a graph for explaining the characteristic of the device shown in FIG. 4 wherein (a) is a graph showing a focal point voltage curve, and (b) is a graph showing quantized voltage data.

FIGS. 4 to 7 are views for explaining a first embodiment of this invention. In FIG. 4 showing an automatic focusing imaging device according to the first embodiment, an image pick-up light formed by an imaging element 16 through a lens system 15 undergoes photoelectric conversion at a photoelectric conversion surface (not shown) within the imaging element 16 to provide a video signal. The video signal thus provided undergoes processing such as filtering or blanking, etc. by a camera circuit 17 to generate a luminance signal From the luminance signal, an edge signal (high frequency band component) is extracted by a high-pass filter (HPF) (filter means) 18. This edge signal is detected by a detector 19. Thus, an output DET is determined.

The signal DET detected by the detector 19 undergoes logarithmic conversion by a logarithmic converter (non-linear conversion means) 20, and results in, a focal point voltage E. For example, a focal point voltage curve is shown in FIG. 5(a).

This focal point voltage E is converted to a digital value e by an A/D converter (digital conversion circuit) 21. Thus, quantized voltage data as shown in FIG. 5(b) is provided.

The quantization step widths after undergone A/D conversion are equidistant, but since the inputted signal DET is subjected to logarithmic convention, the quantization resolution on the low level side of the signal DET is actually high. The focal point voltage which has been digitized, is delivered to a microcomputer 22.

Further, an iris encoder 23 and a zoom encoder 24 are provided in the lens system 15. From the iris encoder 23 and the zoom encoder 24, an entrance pupil D and a focal length f are provided, and are delivered to the microcomputer (calculation means) 22.

Figure 6:
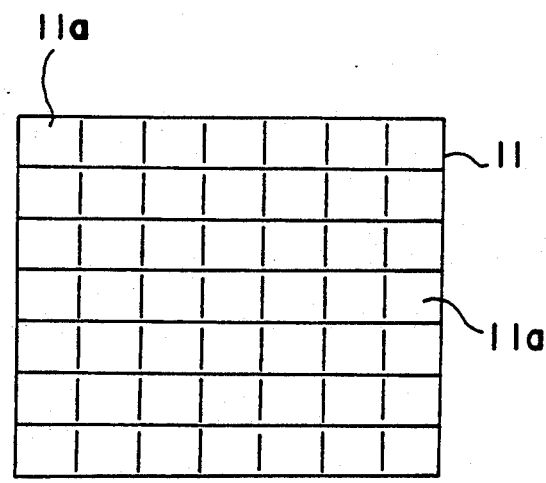
FIG. 6 is an explanatory view showing the state where the imaging frame of the imaging device shown in FIG. 4 is divided into a large number of blocks.

The microcomputer 22 divides, as shown in FIG. 6, the imaging frame 11 into blocks 11a of 9×9 (h,v=1~9) to determine a focus position Y on the basis of a plurality of rules detailed later and controls the focal point position of the lens system 15 through a lens drive mechanism 25.

Figure 7:
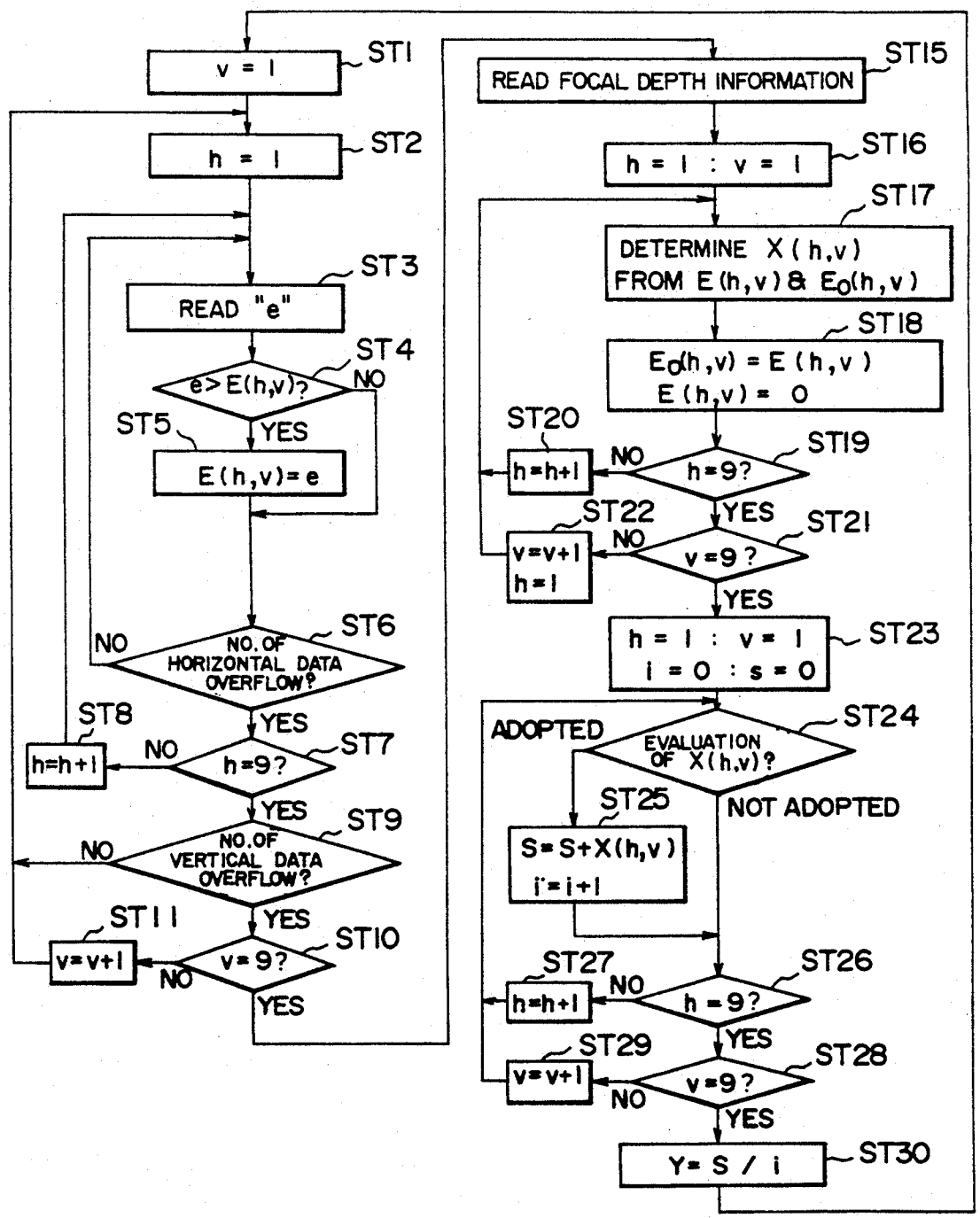
FIG. 7 is a flowchart showing the operation of the imaging device according to the first embodiment shown in FIG. 4.

FIG. 7 is a flowchart showing the operation of the microcomputer of FIG. 4. The operation of the microcomputer 22 will now be described with reference to this figure.

Here, steps ST1 to ST11 shown in on the left side of FIG. 7 represent the operation for the scanning period of one field, and steps ST15 to ST30 shown on the right side thereof represent the operation for the vertical blanking period.

For the scanning period (steps ST7 to ST11), the vertical block number v of the vertical counter showing blocks in a vertical direction is first reset to "1" (step ST1), and the horizontal block number h of the horizontal counter showing blocks in a horizontal direction is reset to "1" (step ST2).

Then, output data e from the A/D converter 21 is read in (step ST3). The data e and the focal point voltage E(h,v) determined last time are compared with each other (step ST4). In the case where the data e is greater than the focal point voltage E last obtained, the data e is taken as a current focal point voltage E(h,v) (step ST5). At step ST6, judgment as to whether or not the number of data in a horizontal direction within one block overflows is made. As a result, when it is judged that that number does not overflow, the control operation return to the step ST3, and steps ST3 to ST6 are repeated. In contrast, when it is judged that that number overflows, the operation proceeds to step ST7.

At the step ST7, judgment as to whether or not the horizontal block number h of the horizontal counter is "9" is made. In the case of NO, the horizontal block number h is incremented (h=h+1). The control operation returns to the step ST3 to execute the steps ST3 to ST7 on the next block positioned on the right side.

At the step ST7, in the case where the horizontal block number h of the horizontal counter is "9", the control operation proceeds to step ST9 to judge whether or not the vertical block number v overflows. As a result, when it is judged that the vertical block number v does not overflow, the operation returns to the step ST2 to reset the horizontal block number h to "1" to execute the steps ST2 to ST9 on the blocks aligned on the lower side.

On the other hand, when it is judged that the number of data in a vertical direction within one block overflows, the control operation proceeds from the step ST9 to the step ST10 to judge whether or not the vertical block number v of the vertical counter is "9". In the case of NO, the value of the vertical block number v is incremented (v=v+1). The steps ST2 to ST9 are executed in connection with the block of the next stage. When the above-mentioned processing is executed in connection with all the blocks, the control operation proceeds from the step ST10 to the step ST15 and steps subsequent thereto.

Accordingly, by executing the above-mentioned processing, the maximum value of the input data e can be determined.

For a vertical blanking period (steps ST15 to ST30), a focal depth information from the iris encoder 23 and the zoom encoder 24 is first taken in (step ST15) to reset both the horizontal block number h and the vertical block number v to "1" (step ST16).

At the subsequent step ST17, an estimated value X(h,v) at the in-focus point on the basis of a focal voltage E(h,v) in a block of values of the horizontal block number h and the vertical block number v and a focal voltage E₀(h,v) in an earlier field where the position of the focusing lens of the lens system 15 is moved by the distance δ in accordance with the following equation(1):

$$X(h,v)=X-\{E(h,v)-E_0(h,v)\}/\{2\delta(K.D/f)^2\}-\delta/2 \qquad (1)$$

The above-mentioned equation (1) will now be described.

If h and v are assumed to be block numbers in lateral and longitudinal direction, respectively, a detected output DET(h,v) of the edge signal of each block can be approximated by the following equation.

$$DET(h,v)=b.EXP[-\{a.(X-X(h,v))\}^2] \qquad (2)$$

A focal voltage E(h,v) obtained by applying logarithmic conversion to the DET(h,v) is expressed as follows:

$$E(h,v) = \log[DET(h,v)] \\ = \log b - \{a \cdot (X - X(h,v))\}^2 \quad (3)$$

In the above-mentioned equations (2) and (3), X represents a present focus adjustment position of the lens, and X(h,v) represents an in-focus position predicted from the focal voltage of the block number h,v. Further, a is a parameter indicating the focal depth of the lens. If a constant determined by the high frequency component extraction method, F-number of the lens system 15, the focal length, and the diameter of the entrance pupil are K, F, f and D, respectively, the above-mentioned parameter a is expressed by the following equation:

$$a = K/F = K.D/f \quad (4)$$

Further, b is a parameter varying in dependence upon the contrast of an object.

Similarly, if the difference of the focus adjustment position of the lens between the present field and an earlier field is $\delta$, the focal voltage $E_0(h,v)$ in the earlier field is expressed as follows:

$$E_0(h,v) = \log b - \{a.(X - X(h,v) - \delta)\}^2 \quad (5)$$

Subtraction of the equation (5) from the equation (3) gives $$E(h,v) - E_0(h,v) = a^2\{2\delta(X - X(h,v)) - \delta^2\} \quad (6)$$

By carrying out substitution of a=K.D/f into the above equation to make arrangement with respect to X(h,v), the above-mentioned equation (1) is provided.

After the estimated value X(h,v) is determined, the control operation proceeds to step ST23 and steps subsequent thereto to first reset both the horizontal block number h and the vertical block number to "1", to reset a counting number i indicating the number of estimated values employed to "0", and to reset the sum total of the estimated values employed to "0".

As the subsequent ST24, the estimated values are evaluated in accordance with predetermined rules (a) to (d) described below to properly select them.

(a) To exclude singular data, an estimated value in a block concerned is compared with an estimated value to exclude an estimated value in an extremely small block.

(b) To preponderantly measure the central portion of the imaging frame, in the case where blocks are positioned at a relatively central portion, so a difference between an estimated value of the block and that of the adjacent block is small, this estimate value is adopted.

(c) In order to follow up moving object, when a block concerned is adjacent to a block from which a last estimated value is provided, and an estimated value is substantially equal to the last estimated value, that value is adopted.

(d) In the case where focus information of a plurality of blocks are substantially equal to each other, the minimum value of average values of estimated values in respective regions is adopted.

In many cases, there are non-effective data X(h,v) in central blocks and the prediction of the focal point becomes erroneous. Therefore, the rule (d) is necessary to prevent this erroneous result.

At the step ST25, the estimated value employed X(h,v) is added to the sum total S, and the counting number i is incremented.

By the processing at step ST26 to ST29, the above-mentioned evaluation is carried out in connection all the blocks (h,v) to determine an average value Y (=S/i) of the sum total S of estimated values employed at step ST30. By this average value Y, the lens drive mechanism (drive means) 25 is controlled, and the automatic focusing of the lens system 15 is controlled.

Accordingly, in accordance with the above-mentioned first embodiment, in the automatic focusing system of predicting the summit (in-focus position) at the foot of the mountain of the so-called focal voltage curve, the logarithmic conversion processing is implemented to a focal voltage before an analog-to-digital conversion. Accordingly, as compared to the method of carrying out an analog-to-digital conversion thereafter to carry out logarithmic conversion processing, the detection accuracy at a low level of the focal voltage is improved. Thus, high accuracy automatic focusing can be carried out.

Further, since there is adopted the system in which a focus area for detecting a focal point is divided into a large number of blocks in a broad range in place of allowing the focus area to be a single small area to predict in advance an in-focus position at the foot of the mountain. Thus, a fast and precise automatic focusing can be carried out in a manner that the focus area of a principal object does not deviate.

It is to be noted that, while in the first embodiment the logarithmic conversion circuit is used as the circuit for converting a high frequency band component outputted from the band-pass filter 18 to a signal component having a characteristic opposite to the out-focus characteristic of the lens, in the case of determining a focal point voltage as a sinusoidal function, a sinusoidal converter may be used in place of the logarithmic converter 20. However, this invention is not limited to such an implementation. There may be employed any converter having a characteristic to improve the resolution of the output level of the detector 19 for which accuracy is required in calculation of the in-focus position.

In addition, while focusing is of a structure to move the lens system 15, it may be of a structure to move the imaging element 16.

Figures 8, 9:
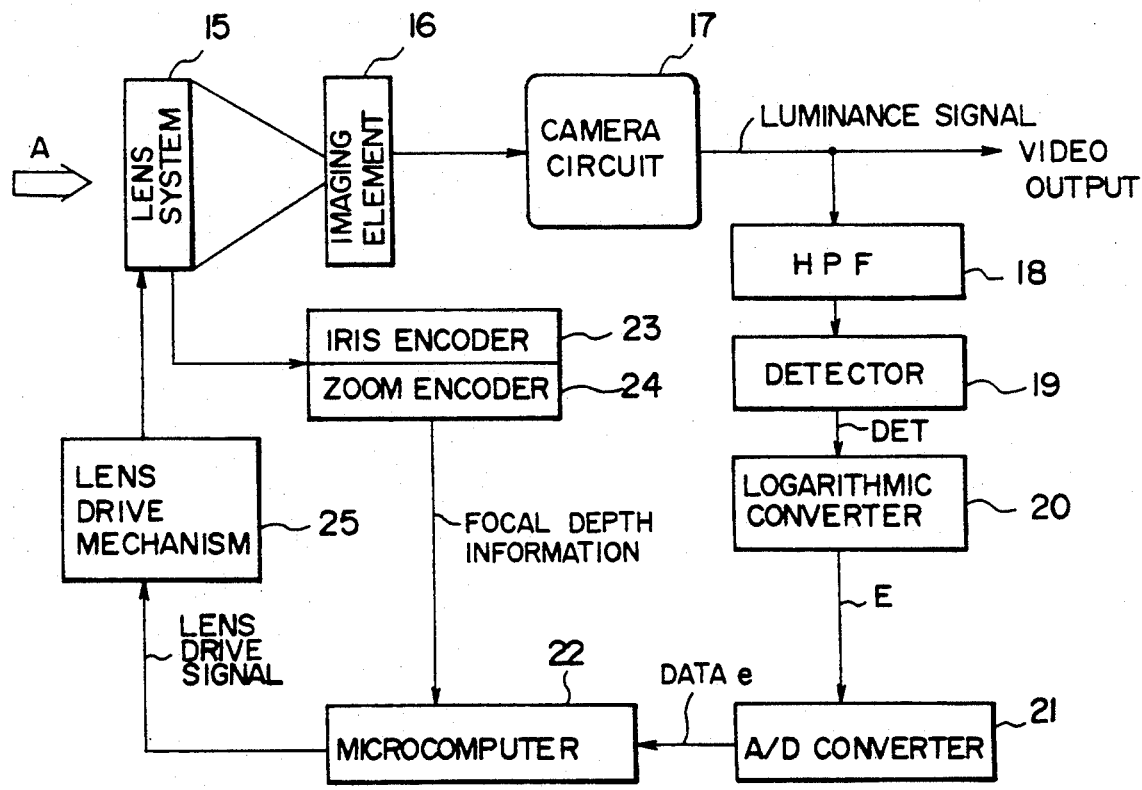
FIG. 8 is a block diagram showing the outline of the configuration of an automatic focusing imaging device according to a second embodiment of this invention.
FIG. 9 is an explanatory view showing the state where the imaging frame of the imaging device shown in FIG. 8 is divided into a large number of blocks.

A second embodiment of an automatic focusing imaging device according to this invention will now be described with reference to FIGS. 8 to 13. The basic configuration of the imaging device according to the second embodiment is shown in FIG. 8. Since reference numerals 15 to 25 in this figure are identical or correspond to respective components of FIG. 4 showing the basic configuration of the device of the first embodiment, repetitive explanation will be omitted.

In the case of the second embodiment, the microcomputer 22 divides, as shown in FIG. 9, the imaging frame 25 into, e.g., 9×9 (h,v=1~9) blocks 26a to determine a focus position Y on the basis of a plurality of rules to control the focal point position of the lens system 15 through the lens driving mechanism 25.

FIGS. 10 to 13 show the operation of the microcomputer 22 in the automatic focusing imaging device shown in FIG. 8. Since control blocks to which the same reference numerals as those of the corresponding FIG. 7 of the first embodiment are respectively attached perform the operations identical or corresponding to those of the control block in FIG. 10, the repetitive explanation will be omitted.

Further, since the descriptions of the operational equations (1) to 5) for calculating an estimated value X(h,v) at the in-focus point are the same as those of the previously described first embodiment, the repetitive explanation will be omitted.

Figure 10:
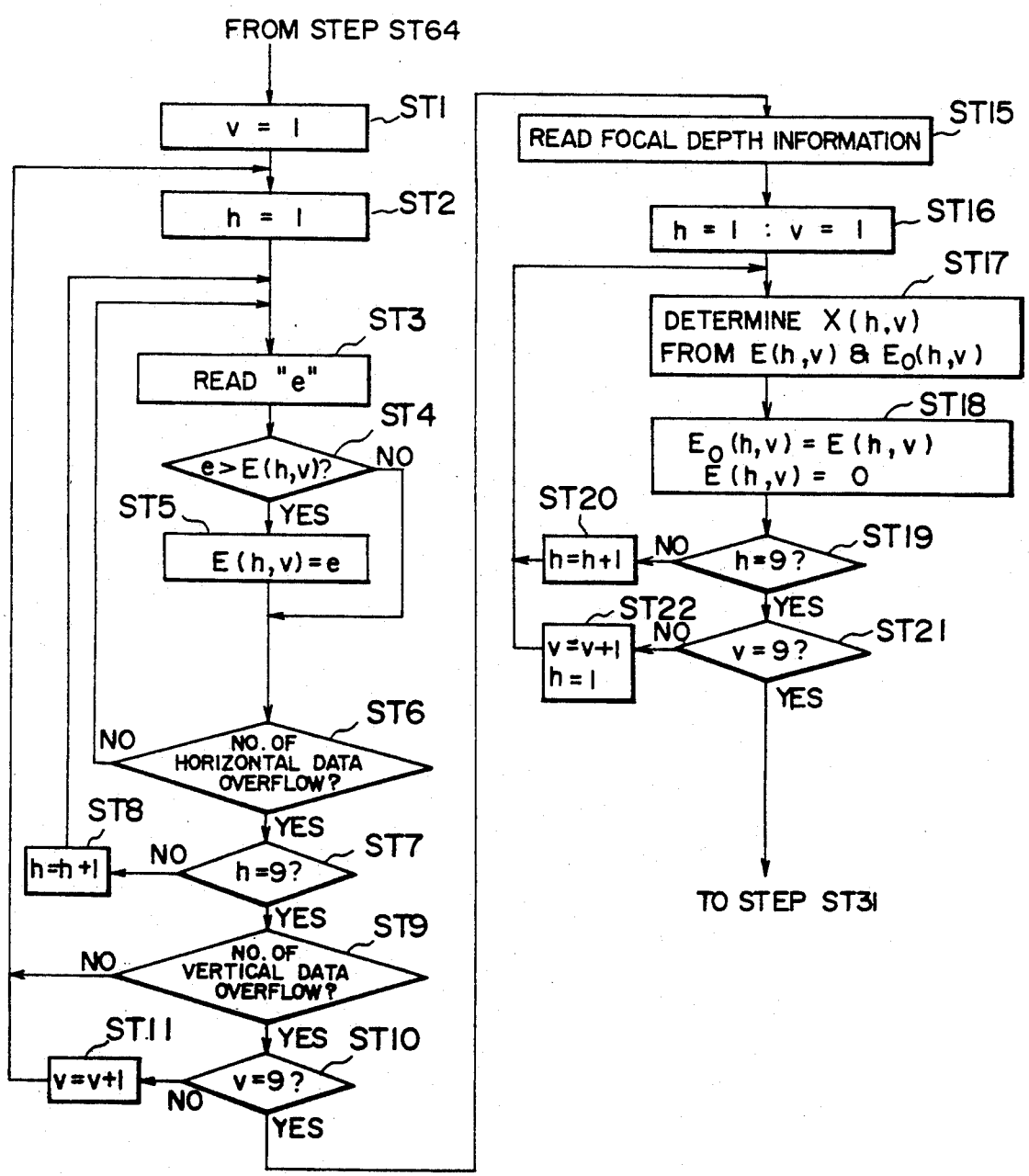
FIG. 10 to 13 are flowcharts showing the operation of the imaging device according to the second embodiment shown in FIG. 8.
Figure 11:
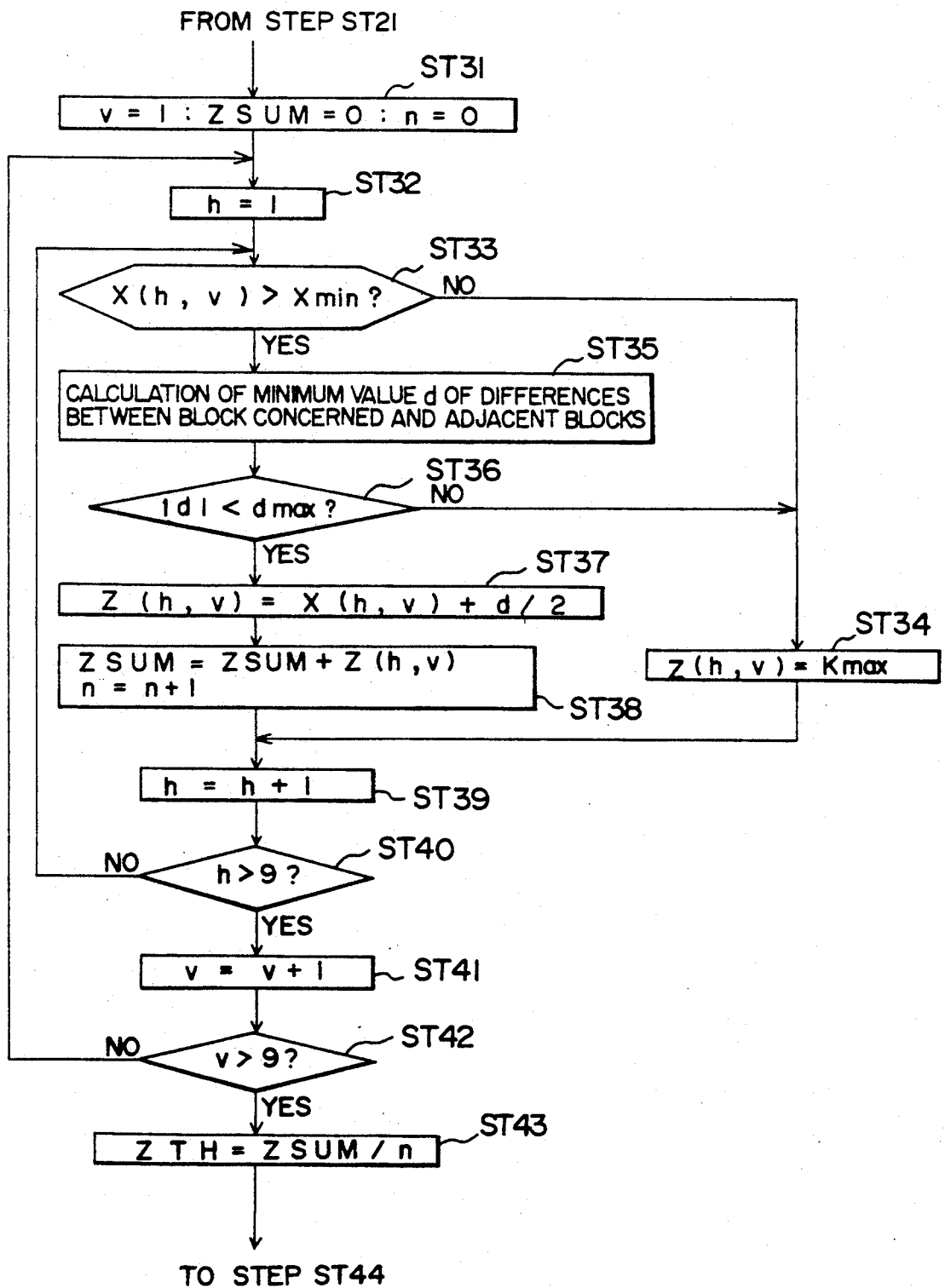

When the estimated value X(h,v) is calculated from the equation (1), the control operation shifts from the step ST21 of FIG. 10 to the step ST31 of FIG. 11. Here, in a manner similar to that in the first embodiment, estimated values are evaluated in accordance with predetermined rules to properly select them. Namely, there are employed four rules of (a) removal of singular data, (b) central portion preponderant measurement, (c) follow-up, (d) prevention of missing of the central portion on the image frame which are the same as the rules (a) to (d) of the first embodiment.

At step ST31, the vertical block number v is reset to "1", and the sum total ZSUM of distance information from which unnecessary portions are removed and the number of data n are reset to "0", respectively. At step ST32, the horizontal block number h in reset to "1".

At the subsequent step ST33, an estimated value X(h,v) is compared with a minimum value $X_{min}$. As a result, when the former is smaller than the latter, substitution of a maximum value $K_{max}$ that the set estimated value X(h,v) can take is carried out (step ST34).

On the other hand, when the estimated value X(h,v) is larger than the $X_{min}$, the control operation proceeds to step ST35 to perform a calculation of a minimum value d of differences between the block concerned and adjacent blocks.

The absolute value "|d|" of the minimum value d and a maximum value set in advance are compared with each other (step ST36). As a result, when the former is greater than the latter, substitution of $K_{max}$ into the equation is carried out to eliminate data of this block (step ST34).

The reason why such an elimination is carried out is that since a principle object has an area extending to some extent, there is high possibility that data greatly different form adjacent distance information may be considered to correspond to an obstacle, or to be based on an erroneous calculation of distance information. Data X(h,v) which has not been eliminated is considered to correspond to the same object as that corresponding to adjacent data in which the difference is minimum. That data X(h,v) and the adjacent data d in which the difference is minimum are averaged. Thus, data Z(h,v) from which unnecessary portions have been eliminated is calculated (step ST37).

At step ST38, data Z(h,v) is added to ZSUM, and the number of data n is incremented (n=n+1).

At step ST39, the horizontal block number h of the horizontal counter is incremented (h=h+1). At the subsequent step ST40, discrimination as to whether of not the value h of the horizontal counter is "9" is made. As a result, when that value is less than 9, control operation returns to the step ST33 for a second time to repeatedly perform similar operation.

In contrast, when that value is greater than 9, the vertical block number v of the vertical counter is incremented (v=v+1) at step ST41 to discriminate whether or not that value is "9" at step ST42. As a result, when that value is less than "9", the control operation returns to the step ST32 for a second time.

On the other hand, when that value is greater than "9", an average value ZTH of distance information Z(h,v) which has not been eliminated is calculated.

Figure 12:
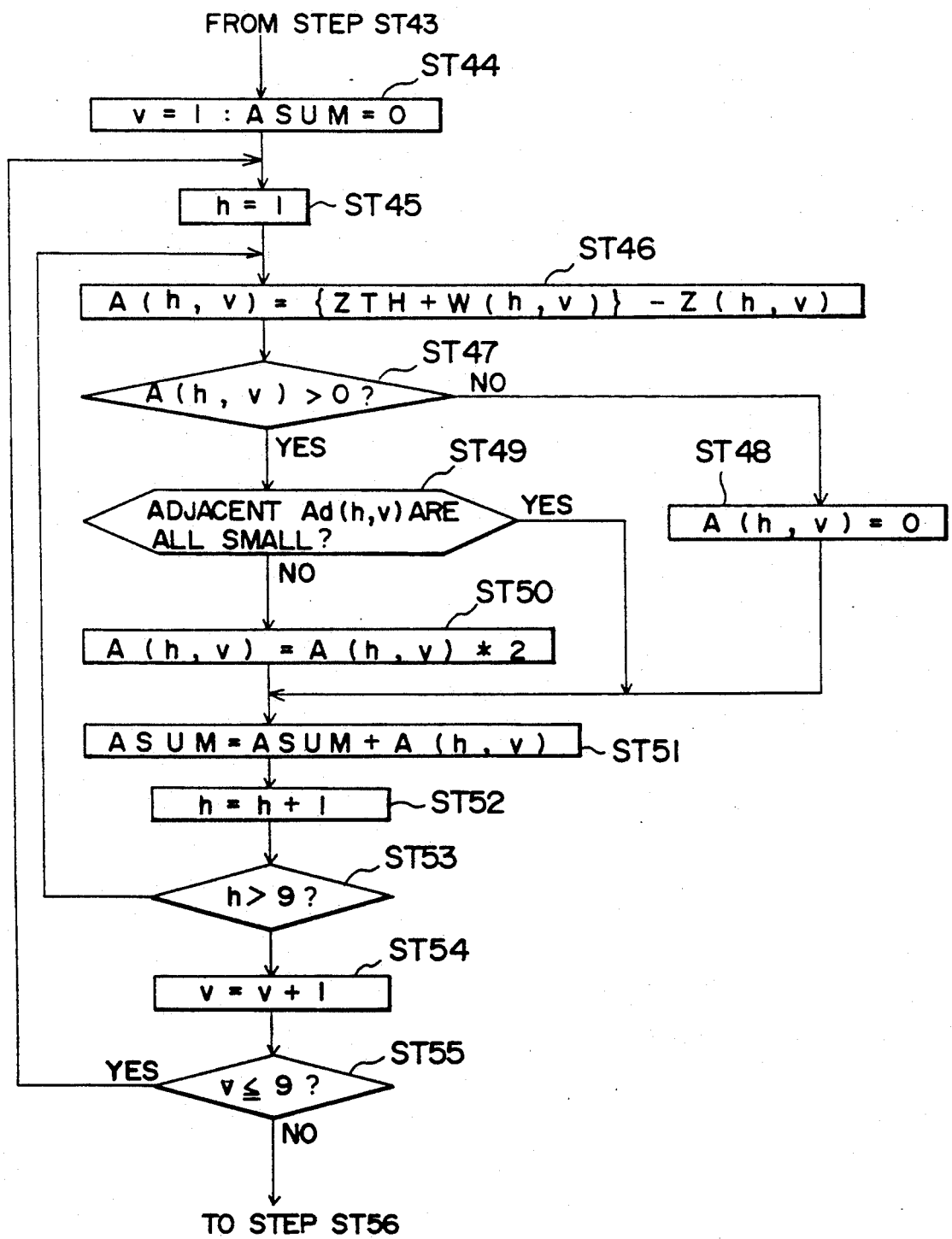

Further, the control operation proceeds to step ST44 shown in FIG. 12. At this step, the vertical block number v of the vertical counter is reset to "1", the sum total of the contribution rate is reset to "0", the value of the horizontal block number h is reset to "1" (step ST45).

At the subsequent step ST46, Z(h,v) is subtracted from the sum of the average value ZTH and the weighting value W(h,v) oft hat block to judge by comparison whether that value is "positive", or "0" or "negative" (step ST47). When that value is positive, it is assumed as A(h,v). In contrast, when that value is "0" or "negative", it is assumed as A(h,v)=0 (step ST48). The control operation then proceeds to step ST51.

Thus, extremely small distance information is eliminated. This is because there is high possibility that an object extremely close may be an obstacle.

The object of this processing is to prevent the erroneous prediction of the focal position because of non-effective data Z(h,v) obtained from central blocks on the imaging frame.

It is to be noted that the weighting values are used in order to improve preponderance at the central portion of the screen as shown in FIG. 9, and to prevent that the contribution rates all become "0" in the case where Z(h,v) is fixed over the entire screen, and have an arrangement such that they vary from negative to positive in a range from the peripheral portion of the screen toward the central portion.

At step ST49, in the case where contribution factors Ad of the same block in an early field and blocks adjacent hereto are all small, the control operation proceeds to ST51. In the case where the contribution factor of a remarked block is high, anyone of the contribution factors of the same block in an early block and that of blocks adjacent thereto is high, the control operation proceeds to step ST50, at which the contribution factor A(h,v) is doubled.

This is because in the case where any one of contribution factors of the same block in an early field and blocks adjacent thereto is high, the portion judged to be a principal object by the last conjecture is assumed to move, and therefore it is highly probable that this block represents the principal object.

Thus, the imaging device is permitted to have a function to follow up a principal object.

At step ST51, sum total of contribution factors is calculated in order to normalize the contribution factor. At step ST52, the horizontal block number h of the horizontal counter is incremented (h=h+1). At step ST53, discrimination as to whether or not that number is less than "9" is made. As a result, in the case where the number h value is less than "9", the control operation returns to the step ST46 for a second time.

In contrast, in the case where the number h is greater than "9", the vertical block number v of the vertical counter is incremented (v=v+1). As a result, in the case where the number v of the vertical counter is less than "9", the control operation returns to the step ST45.

Figure 13:
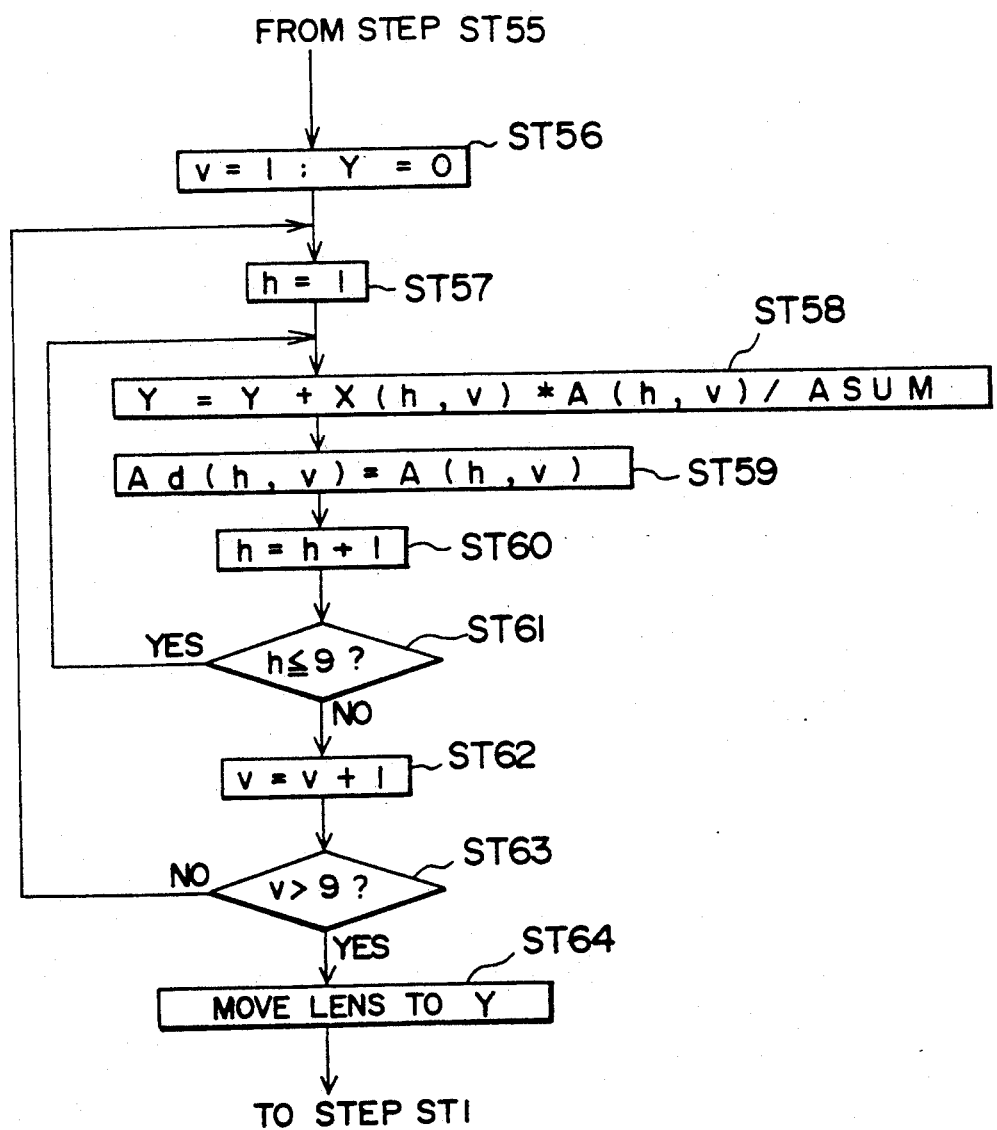

In the case where the number v of the vertical counter is greater than 9 at step ST54, the vertical block number v of the vertical counter is reset to "1" as shown in FIG. 13, the value Y of a memory indicating the lens movement distance is reset to "0" (step ST56), and the number h of the horizontal counter is reset to "1" (step ST57).

At step ST58, distribution factors A(h,v)/ASUM with respect to an overall focus value Y (in-focus position of the focus lens system) of estimated distance information X(h,v) in respective blocks are calculated to calculate an integrated value of these values to use the calculated result as an overall focus value Y (in-focus position) to be required.

At step ST59, contribution factors Ad(h,v) of respective blocks are stored. At the subsequent step ST60, the number h of the horizontal counter is incremented (h=h+1). At step ST61, discrimination as to whether or not the number h is less than "9" is made. As a result, in the case where the number h is less than "9", the control operation returns to the step ST58 for a second time. In contrast, in the case where the number h is greater than "9", the number v of the vertical counter is incremented (v=v+1) (step ST62). At step ST63, judgment as to whether or not the number v of the vertical counter is greater than "9" is made. As a result, in the case where the number v is greater than "9", the lens system 15 is moved (step ST64), by the lens drive mechanism (drive means), to the in-focus position on the basis of a calculated result at the step ST58.

When the processing at the step ST64 is completed, the control operation returns to the step ST1 for a second time (to the next field). At the step ST63, in the case where the number v of the vertical counter is less than "9", the control operation returns to the step ST57 to repeatedly execute the operation subsequent thereto.

Accordingly, in accordance with the second embodiment, there is employed a structure such that a focus area for detecting a focal point is divided into a plurality of blocks on the screen to calculate in advance in-focus values in respective blocks to calculate an in-focus value of the entirety of the screen on the basis of calculated results of the respective blocks. Thus, focusing can be carried out at a high speed, and even in the case where a principal object within the screen moves, or the case where the contrast of any other object is higher than that of a principal object, there does not occurs an erroneous operation such that focusing with respect to the principal object deviates.

Further, in the auto focusing system for predicting a summit point (in-focus position) of the so-called focal point voltage curve by the voltage measured at the foot point of the curve, the logarithmic conversion processing is carried out before a focal point voltage is subjected to an analog-to-digital conversion.

Accordingly, as compared to the system of carrying out an analog-to-digital conversion thereafter to conduct a logarithmic conversion processing, the detection accuracy at a low level of the focal point voltage is improved. Thus, a high precision automatic focusing can be carried out.

In addition, since the focal depth information is used as a parameter to implement a predetermined calculation processing, high precision in-focus position can be predicted.

Figure 14:
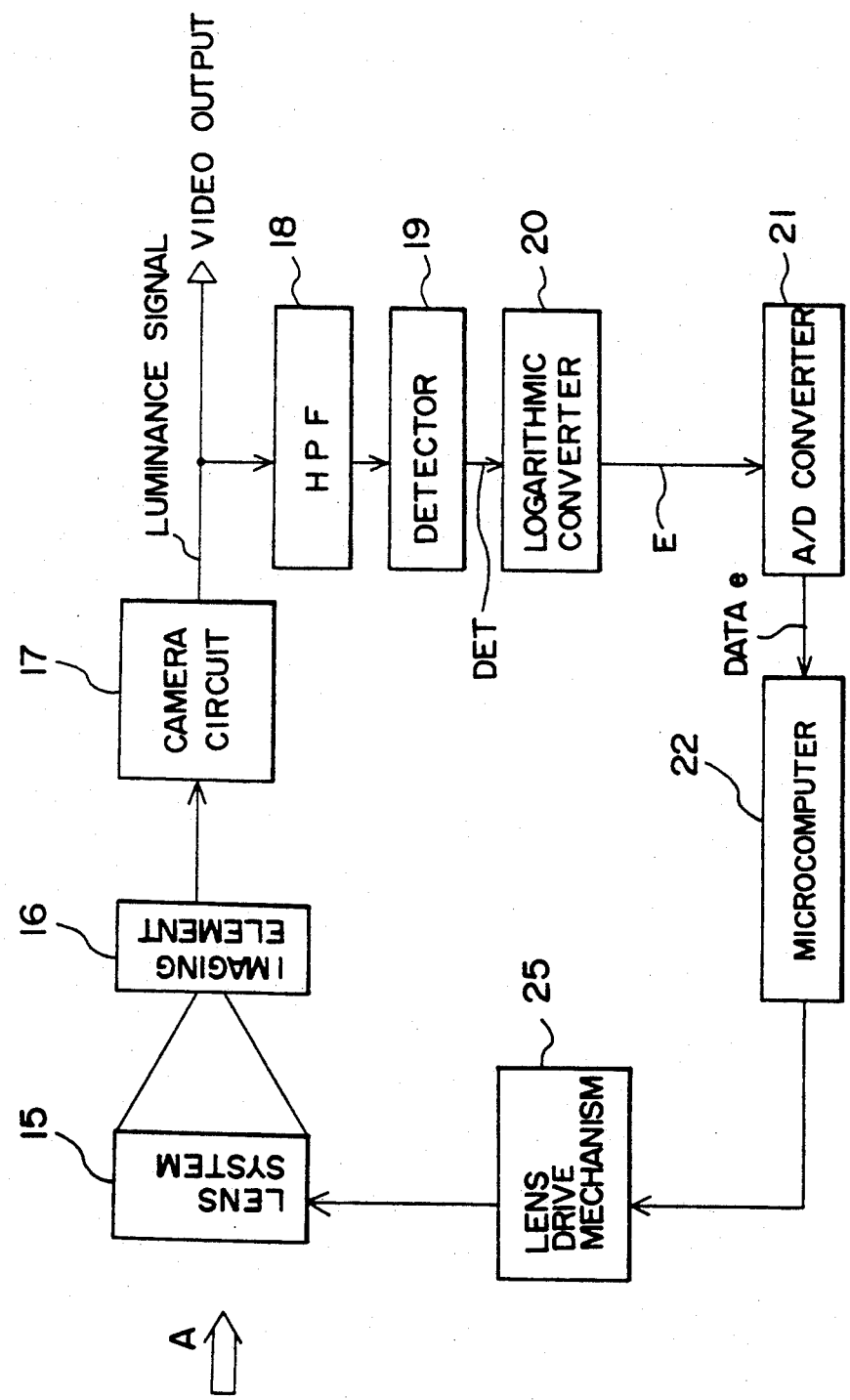
FIG. 14 is a block diagram showing the outline of the configuration of an automatic focusing imaging device according to a third embodiment of this invention.

FIG. 14 is a block diagram showing a third embodiment of an automatic focusing imaging device according to this invention where in the same reference numerals are attached to the same components of those of the first and second embodiments, respectively, and the repetitive explanation will be omitted.

Similarly to the first and second embodiments, a signal DET detected by detector 19 is subjected to logarithmic conversion by logarithmic converter 20 to provide a focal point voltage E. The focal point voltage E thus obtained is then converted to a digital value e by A/D converter 21, and is delivered to microcomputer 22. This microcomputer 22 divides, as shown in FIG. 9, imaging frame 5 into 9×9 (h,v=1~9) blocks 26a to determine a focus position on the basis of predetermined rules to control a focal point position of the lens system 15 through the lens driving mechanism 25.

Particularly in the third embodiment, there is employed a structure in which the focal depth information becomes unnecessary and iris encoder 23 and zoom encoder 24 required in the first and second embodiments are omitted.

Figure 15:
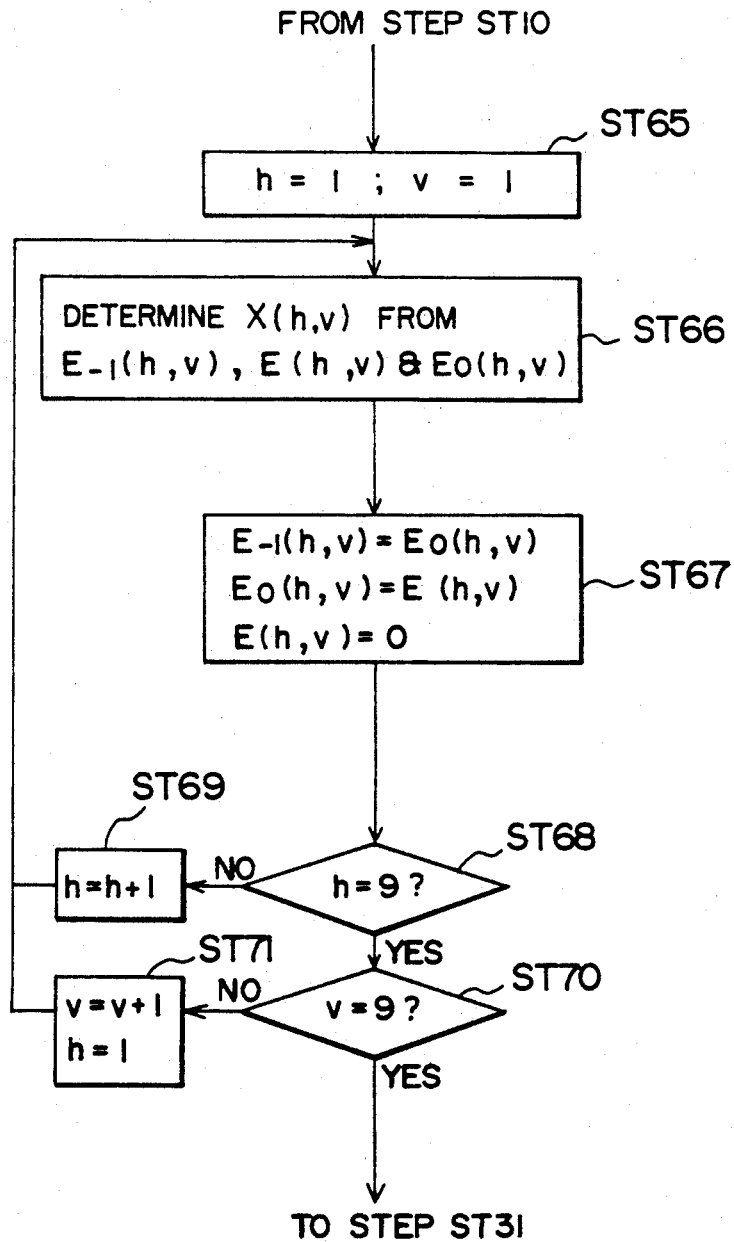
FIG. 15 is a flowchart showing the operation of the imaging device according to the third embodiment shown in FIG. 14 in connection with only the portion different from the operation of the second embodiment.

FIG. 15 is a flowchart showing the operation of the microcomputer 22 where in there are processing steps executed for the scanning period of one field and processing steps executed for a vertical blanking period thereof in the same manner as in the first and second embodiments. Since the processing operations up to the processing at steps ST1 to ST11 executed for the scanning period and the processing at steps ST31 to ST64 for the vertical blanking period shown in FIGS. 11 to 13 are the same as those of the second embodiment, their disclosure will be omitted, and only the flowchart of the portion corresponding to the steps ST15 to ST22 for the vertical blanking period of FIG. 10 is illustrated.

When respective steps for the scanning period are completed in FIG. 15, and the maximum value of all input data e of respective blocks is calculated, the control operation proceeds to step ST65 and steps subsequent thereto.

At the step ST65, both the number h of the horizontal counter and the number v of the vertical counter are reset to "1".

At the subsequent step ST66, an estimated value X(h,v) of the in-focus point on the basis of a focal point voltage E(h,v) in a block of the number h of the horizontal counter and the number v of the vertical counter, a focal point voltage $E_0(h,v)$ in an early field where the position of the focusing lens of the lens system 15 is moved by a distance $\delta$, and a focal point voltage $E_{-1}(h,v)$ in a field earlier than that of the focal point voltage $E_0(h,v)$ where the position of the focusing lens is further moved by a distance $\delta$ in accordance with the following equation (7) (steps ST65 to ST71).

At step ST67, the focal point voltage $E_{-1}(h,v)$ is replaced by $E_0(h,v)$, the focal point voltage $E_0(h,v)$ is replaced by $E(h,v)$, and the focal point voltage $E(h,v)$ is replaced by "0".

Calculation in this case is performed in accordance with the following equation (7):

$$X(h,v) = X - \frac{\delta}{2} \{E(h,v) - E_{-1}(h,v)\} / \{E(h,v) - 2E_0(h,v) + E_{-1}(h,v)\} \qquad (7)$$

The equation (7) will now be described.

An output DET from detector 19 for an edge signal corresponding to each block is, similarly to the equation (2) of the first embodiment, expensed as follows:

$$DET(h,v) = b \cdot EXP[-\{a \cdot (X - X(h,v))\}^2] \qquad (8)$$

where a is a parameter relating to the focal depth of the lens indicated by the equation (4), and b is a parameter relating to the contrast of an object.

By applying logarithmic conversion to DET(h,v) of the equation (8), a focal point voltage is provided. If focal point voltages in the case where the focus adjustment position of the lens is X, X+δ and X−δ are represented by $E_0(h,v)$, $E(h,v)$ and $E_{-1}(h,v)$, respectively, these focal point voltages are expressed as follows:

$$E(h,v) = \log b - \{a(X - X(h,v) + \delta)\}^2 \quad (9)$$

$$E_0(h,v) = \log b - \{a(X - X(h,v))\}^2 \quad (10)$$

$$E_{-1}(h,v) = \log b - \{a(X - X(h,v) - \delta)\}^2 \quad (11)$$

Accordingly, when the equation (11) is subtracted from the equation (9), the parameter b is eliminated as indicated by the following equation (12).

$$E(h,v) - E_{-1}(h,v) = -4a^2\delta\{(X - X(h,v))\} \quad (12)$$

Calculation of $(9)+(11)-(10) \times 2$ gives $$E(h,v) - 2E_0(h,v) + E_{-1}(h,v) = -2a^2\delta^2 \quad (13)$$

If the absolute value of the equation (13) is not close to zero, when the equation (12) is divided by the equation (13), the parameter a is eliminated.

$$\{E(h,v) - E_{-1}(h,v)\}/\{E(h,v) - 2E_0(h,v) + E_{-1}(h,v)\} = 2\{X - X(h,v)\}/\delta \quad (14)$$

By arranging the above equation in connection with X(h,v), a calculation formula of the in-focus position shown by the equation (7) is provided.

Let now consider the case where the characteristic of the logarithmic converter 20 deviates.

The deviation in the characteristic of the logarithmic converter 20 is expressed below;

$$E(h,v) = a(X+\delta)[\log b - \{a(X - X(h,v) + \delta)\}^2] \quad (9)\text{-}1$$

$$E_0(h,v) = a(X)[\log b - \{a(X - X(h,v))\}^2] \quad (10)\text{-}1$$

$$E_{-1}(h,v) = a(X-\delta)[\log b - \{a(X - X(h,v) + \delta)\}^2] \quad (11)\text{-}1$$

Here, since the relationship of $X \simeq X - \delta \simeq X + \delta$ holds, the relationship of $a(X+\delta) \simeq a(X) \simeq a(X-\delta)$ is established. These parameters are canceled in the middle of calculation similarly to a and b.

When the estimated value X(h,v) has been calculated, the control operation proceeds to the step ST31 to perform the same operation as that of the previously described second embodiment.

Accordingly, in accordance with the third embodiment, since the in-focus position can be calculated without using focal depth information, the iris encoder and the zoom encoder 24 become unnecessary. Thus, the imaging device can be simplified.

Further, since the characteristic deviation of the logarithmic converter 20 can be canceled in the middle of calculation, even if the characteristic of the logarithmic converter 20 may deviate due to temperature, etc., there is no hindrance in the operation.

It is to be noted that while, in the third embodiment, the logarithmic converter 20 is used as the circuit for converting an edge signal (high frequency component) outputted from the high-pass filter 18 so that it has a characteristic opposite to the shading characteristic of the lens, this invention is not limited to such an implementation. Namely, there many be any circuit having such a characteristic to improve the resolution of the level of a detected output for which accuracy is required in calculation of the in-focus values.

In addition, while focusing is of a structure to move the lens system 15, it may be of a structure to move the imaging element 16.

An automatic focusing imaging device according to a fourth embodiment of this invention will now be described with reference to FIGS. 16 and 17. The device of the third embodiment is of a structure capable of an accurate and speedy focusing while preventing the influence of the so-called fluorescent lamp flicker.

Figure 16:
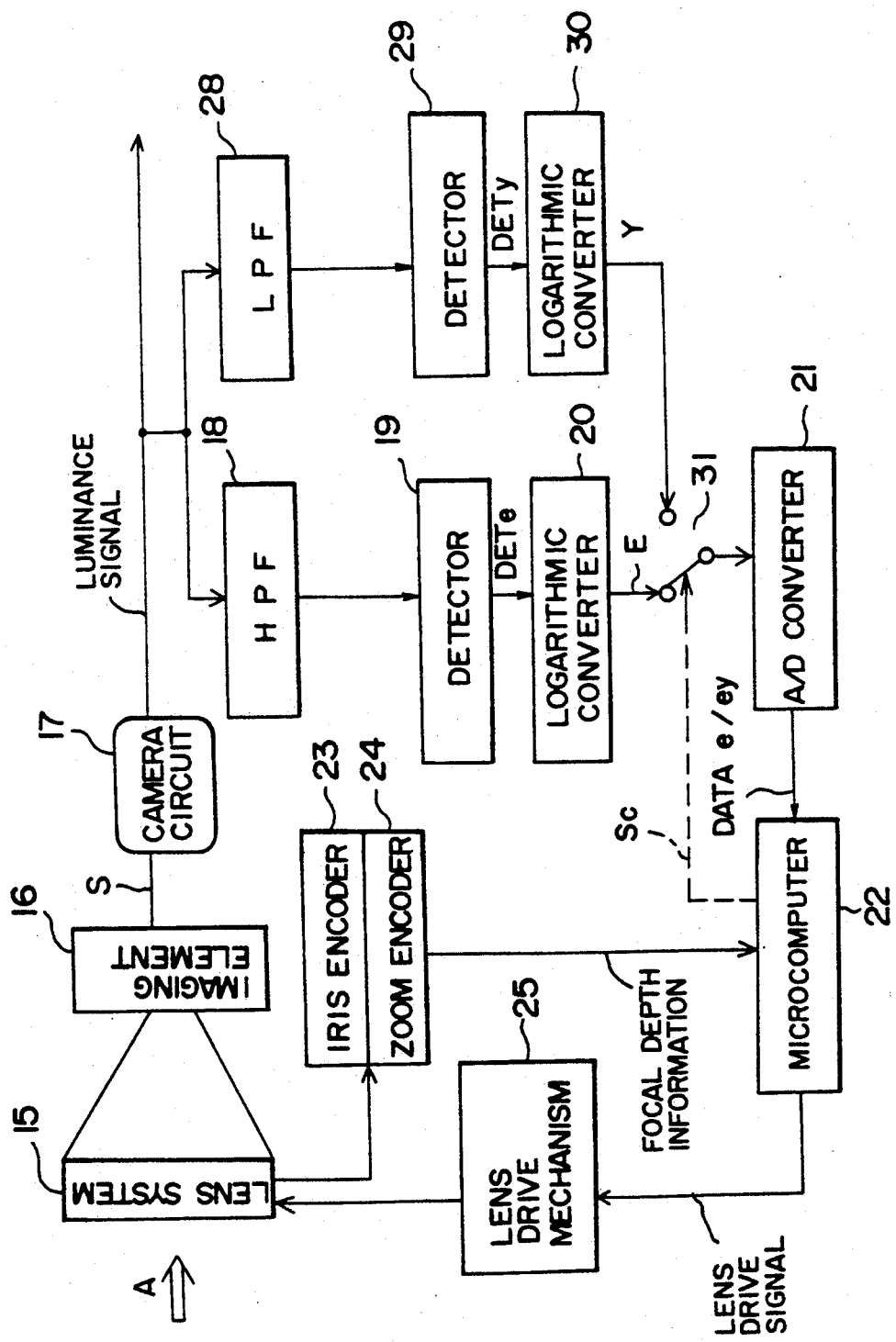
FIG. 16 is a block diagram showing the outline of the configuration of an automatic focusing imaging device according to a fourth embodiment of this invention.

Since reference numerals 15 to 25 in FIG. 16 denote elements identical or corresponding to the components of the same reference numerals in the first and second embodiments, respectively, their repetitive explanation will be omitted. The imaging device shown in FIG. 16 includes, in addition to the above-mentioned configuration, a low-pass filter (LPF) 28 for extracting a low frequency component of a luminance signal outputted from camera circuit 17, a second detector 29 for detecting a low frequency luminance signal extracted by the LPF 28 to extract a signal DETy, a second logarithmic converter 30 for applying logarithmic conversion to the signal DETy thus to take out a luminance low frequency component signal Y, and a switch 31 for successively carrying out switching between focal point voltage E and the luminance low frequency signal Y which are respective outputs from the logarithmic converters 20 and 30. A/D converter 21 supplied with a voltage E or signal Y through the switch 31 outputs a corresponding digital value e or ey. This digital value e is a step voltage having a digital value as shown in FIG. 5(a) used in the explanation of the first embodiment. This step voltage is a signal having substantially equidistant step widths such that there is no possibility that the step width is not extremely broad in the vicinity of a low level.

Explanation will now be given with reference to FIG. 17 in connection with the imaging device according to the fourth embodiment constructed above, particularly the operation of the microcomputer 22. Since FIG. 17 substantially corresponds to FIG. 7 used in the explanation of the operation of the first embodiment, the same step reference numerals are attached to the same operations, respectively, and their repetitive explanation will be omitted. Only operation steps peculiar to the fourth embodiment will be preponderantly described.

Figure 17:
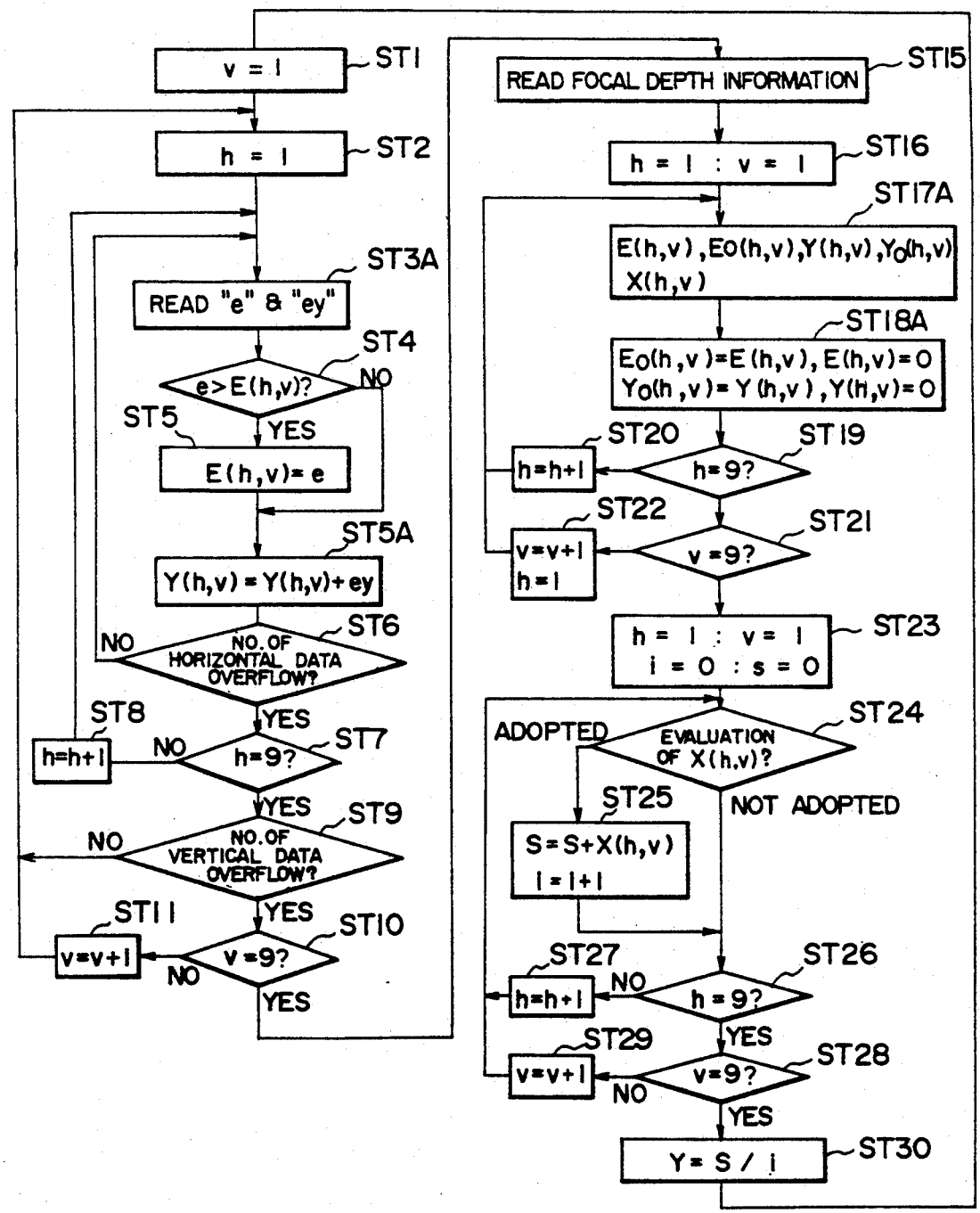
FIG. 17 is a flowchart showing the operation of the imaging device according to the fourth embodiment shown in FIG. 16.

Since the A/D converter 21 successively converts and outputs outputs from the respective logarithmic converters 20 and 30 by the switching operation of the switch 31, output data e and ey are interchangeably and successively read in at step ST3A in FIG. 17.

In the case where it is judged at step ST4 that "e is equal to or smaller than E(h,v)" and in the case where it is judged at step ST4 that "e is larger than E(h,v)" and "E(h,v) is set to e" at step ST5, an integrated value Y(h,v) of the low frequency band component data ey of the block (h,v) is calculated at step ST5A. It is to be noted that, in extracting data ey, an approach may be employed to exclude extremely large values and small values to average values except for the above.

Since the processing steps ST6 to ST11 for an imaging period succeeding to the above are the same as those of FIG. 7 which have been described in the first embodiment, the repetitive explanation will be omitted. By executing such processing in connection with respective blocks, it is possible to calculate the maximum value E(h,v) of the input data e and the integrated value Y(h,v) of the input data ey.

Further, since the respective steps for a vertical blanking period are substantially the same as those of FIG. 7, only steps peculiar to the fourth embodiment will be described.

When both the value h of the horizontal counter and the value v of the vertical counter are reset to "1" at step ST16, an estimated value (h,v) of the in-focus point of each block on the basis a focal point voltage E(h,v) and a luminance low frequency component signal Y(h,v) in a block of the value h of the horizontal counter and the value v of the vertical counter, a focal point voltage $E_0$ and a luminance low frequency component signal $Y_0(h,v)$ in an early field where the position of the focusing lens of the lens system 15 is moved by a distance δ in accordance with the following equation (15) (refer to steps ST17A-ST21).

$$X(h,v) = X - [(E(h,v) - E_0(h,v)) - \{Y(h,v) - Y_0(h,v)\}]/2(K.D/f)^2 \delta - \delta/2 \quad (15)$$

where X is a present position of the lens.

The equation (15) will now be described.

If the intensity of illumination of a fluorescent lamp at the time of picking up an image, an output DETe(h,v) from the detector 26 for an edge signal in each block is approximately expressed as follows:

$$DETe(h,v) = b.H(h,v)EXP[-\{a.(X-X(h,v))\}^2] \quad (16)$$

Here, a of the equation (16) is a parameter indicating the focal depth. When a constant determined by the method of extracting a high frequency band component is assumed as K and a F-number of the lens system 15 is assumed as F, the parameter a is expressed as follows:

$$a = K/F = K.D/f$$

Further, b of the equation (12) varies in dependence upon the contrast of an object picked up by the imaging element 16.

The luminance low frequency component signal DETy(h,v) is expressed by the following equation (17):

$$DETy(h,v) = C.H(h,v) \quad (17)$$

C is a value varying in dependence upon the reflection factor of an object.

Here, the focal point voltage E(h,v) is expressed as follows:

$$\begin{aligned} E(h,v) &= \log\{DETe(h,v)\} \\ &= \log b + \log H(h,v) - \{a \cdot (X - X(h,v))\}^2 \end{aligned} \quad (18)$$

If the intensity of illumination in an early field is $H_0(h,v)$, the focal point voltage $E_0(h,v)$ is expressed as follows:

$$E_0(h,v) = \log b + \log H_0(h,v) - \{a.(X-X(h,v)-\delta)\}^2 \quad (19)$$

Accordingly, when the equation (19) is subtracted from the equation (18), b is eliminated as indicated by the following equation (20)

$$E(h,v) - E_0(h,v) = \quad (20)$$
$$a^2\{2\delta(X - X(h,v)) - \delta^2\} + [\log\{H(h,v)\} - \log\{H_0(h,v)\}]$$

Similarly, when the logarithmic conversion is applied to the luminance low frequency component signal DETy(h,v), Y(h,v) and $Y_0(h,v)$ are expressed as follows:

$$Y(h,v) = \log C + \log\{H(h,v)\} \quad (21)$$

$$Y_0(h,v) = \log C + \log\{H_0(h,v)\} \quad (22)$$

When the equation (22) is subtracted from the equation (21), C is canceled as indicated by the following equation (23), so the flicker component of illumination is left.

$$Y(h,v) - Y_0(h,v) = [\log\{H(h,v)\} - \log\{H_0(h,v)\}] \quad (23)$$

When the equation (23) is subtracted from the equation (20), the influence of the flicker of illumination is eliminated as indicated by the following equation (24).

$$(20)-(23) = a^2\{2\delta(X-X(h,v))-\delta^2\} \quad (24)$$

Here, when substitution of a=K.D/f into the above equation is conducted to arrange it, the estimated value X(h,v) is expressed by the above-described equation (15).

When the estimated value X(h,v) has been calculated, the control operation proceeds to step ST23 to reset both the value h of the horizontal counter and the value v of the vertical counter to "1", to resent the value i of the counter indicating the number of estimated values adopted to "0", and to reset the sum total of the estimated values adopted to "0". Since the operations of the steps ST24 to ST30 subsequent to the above are the same as those of FIG. 7 showing the first embodiment, the repetitive explanation will be omitted.

In accordance with the above-mentioned fourth embodiment, in the automatic focusing imaging device adapted to predict a summit (in-focus position) of the mountain at the so-called foot of the mountain, there is employed a structure to eliminate flicker components corresponding to respective blocks in the middle of prediction of the in-focus position. Accordingly, even in the case where an image is picked up under a fluorescent lamp of which luminance intensity varies, or the like, auto focusing having a fast response and free from any erroneous operation can be carried out.

Further, since the logarithmic conversion processing is carried out before a focal point voltage is subjected to an analog-to-digital conversion, as compared to the system of carrying out an analog-to-digital conversion thereafter to conduct the logarithmic conversion processing, the detection accuracy at a low level of the focal point voltage is improved. Thus, high accuracy automatic focusing can be carried out.

Furthermore, since the focal point depth information is used as a parameter to implement a predetermined calculation processing, high accuracy in-focus position can be predicted.

In addition, since there is employed the system in which the focus area for detection of a focal point is divided into a large number of blocks in a broad range in place of allowing the focus area to be a single small area to predict in advance the in-focus position at the foot of the mount, high speed and accurate auto focusing can be carried out without deviation of focusing for a principal object.

Figure 18:
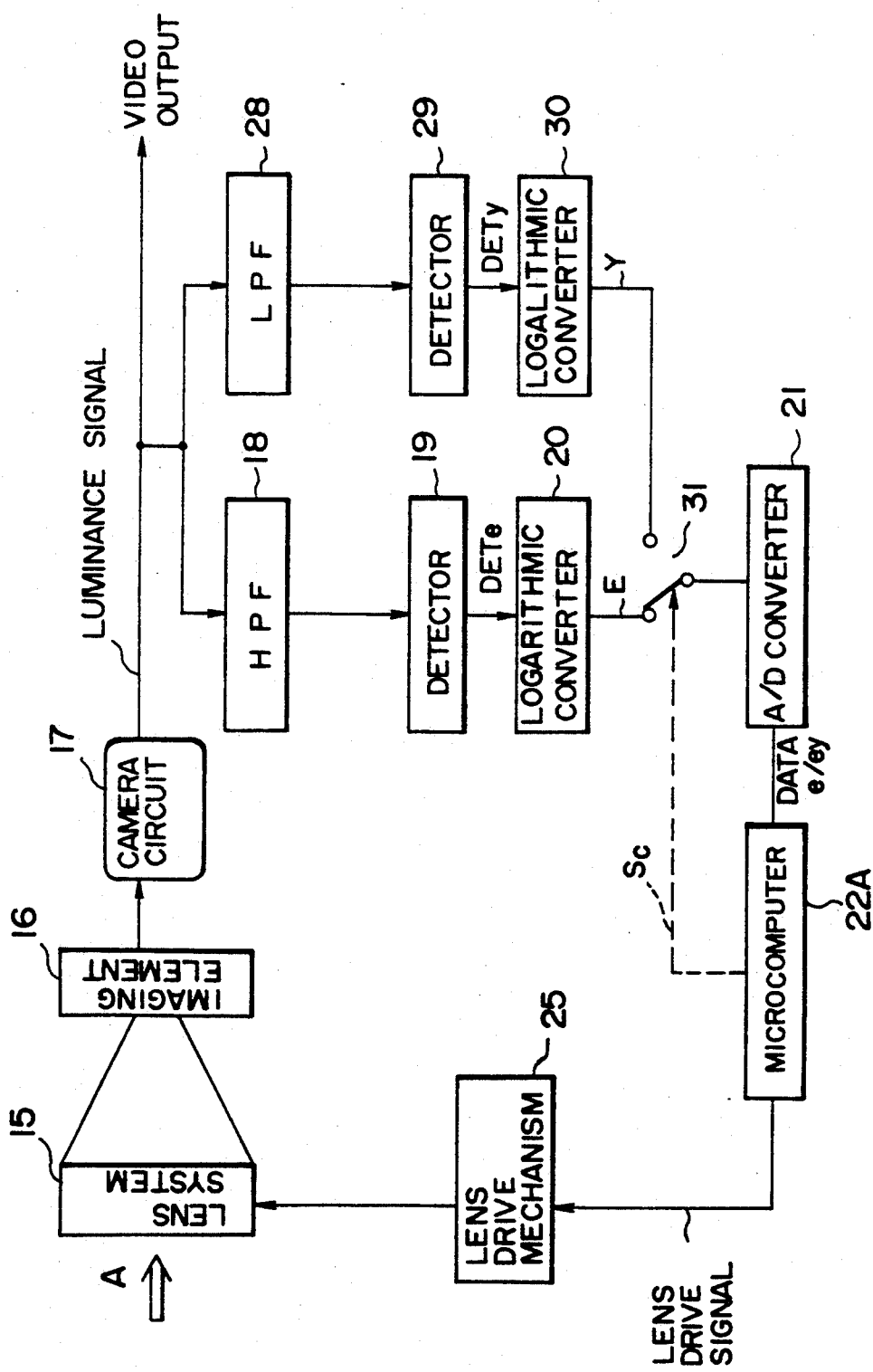
FIG. 18 is a block diagram showing the outline of the configuration of an automatic focusing imaging device according to a fifth embodiment of this invention.

FIG. 18 is a block diagram showing a fifth embodiment of an automatic focusing imaging device according to this invention. The same reference numerals are attached to the same components as those of FIG. 4, respectively, and their detailed explanation will be omitted.

Similarly to the fourth embodiment, a focal point voltage E is detected by detector 19 and is subjected to logarithmic conversion by logarithmic converter 20. The focal point voltage thus processed is taken out.

Further, luminance low frequency component signal Y is detected by detector 29, and is then taken out. These focal point voltage E and luminance low frequency component signal Y are successively switched by a control signal $S_c$ from a microcomputer 22A. They are delivered to A/D converter 21.

Here, data e and ey converted to digital data are delivered to the microcomputer 22A. This microcomputer 22A determines a focus position on the basis of predetermined rules in connection with a plurality of blocks 11a shown in FIG. 5 to control the focal position of the lens system 15 through lens driving mechanism 25.

Particularly, in the fifth embodiment, there is employed a structure such that the lens data relating it's focus depth is unnecessary, thereby making it possible to omit the iris encoder 23 and the zoom encoder 24 required in the fourth embodiment.

Figure 19:
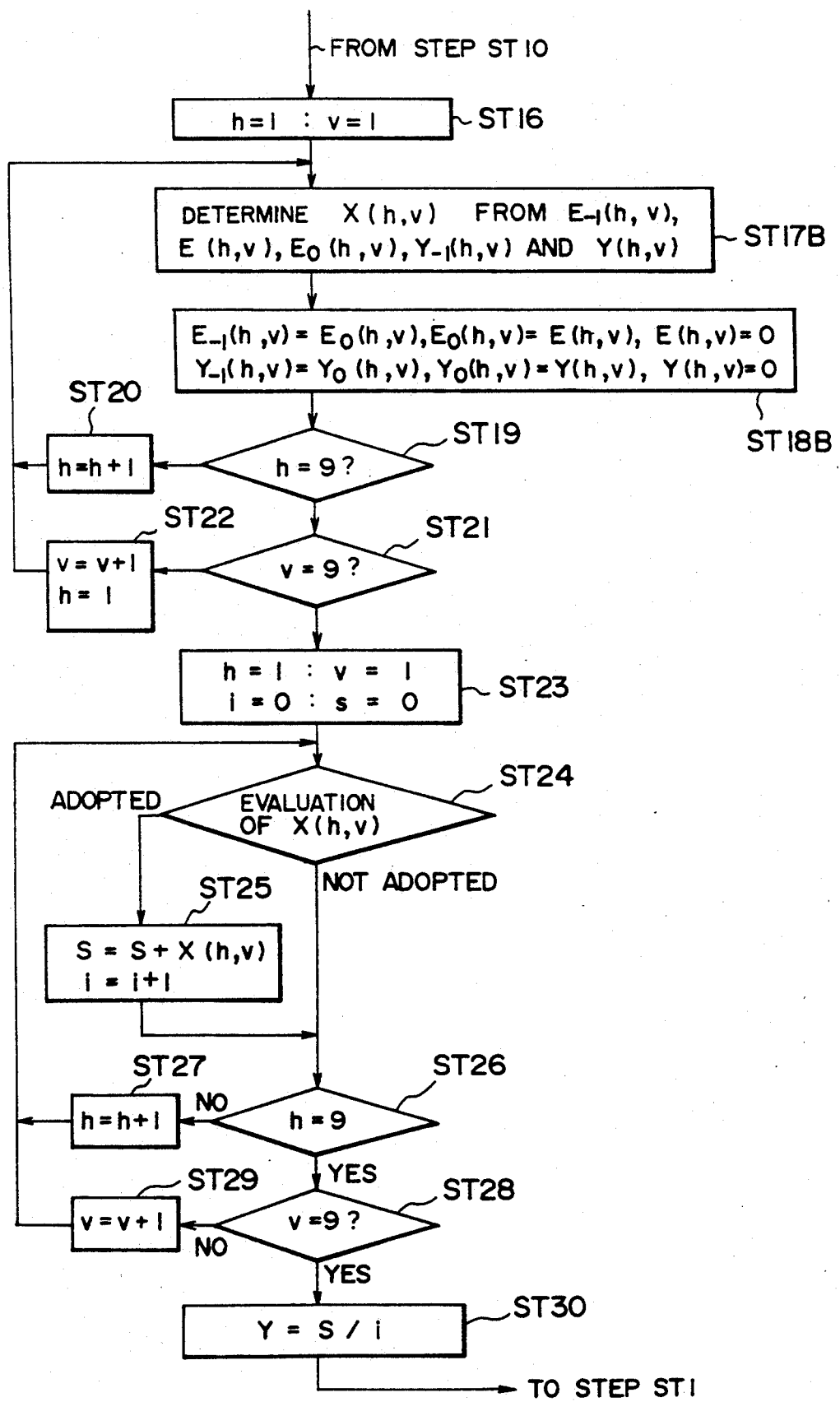
FIG. 19 is a flowchart showing, in a comparative manner, the operation of the imaging device of the fifth embodiment shown in FIG. 18 and the operation of the fourth embodiment shown in FIG. 17.

FIG. 19 is a flowchart showing the operation of the microcomputer 22A wherein there are steps executed for an imaging period and steps executed for a vertical period similarly to the above-described fourth embodiment. Since the steps ST1 to ST11 executed for an imaging period are the same as those of the fourth embodiment, their disclosure is omitted, and only the flowchart for a vertical period is illustrated.

When respective steps for the scanning period are completed and the maximum value of input date e in all of respective blocks, the control operation proceeds to the step ST16 and steps subsequent thereto.

At the step ST16, the horizontal block number h of the horizontal counter and the vertical block number v of the vertical counter are both reset to "1".

At the subsequent step ST17B, and estimated value X(h,v) at the in-focus point on the basis of a focal point voltage E(h,v) and a luminance low frequency component signal Y(h,v) in a block of the value h of the horizontal corner and the value v of the vertical counter, a focal point voltage $E_0$(h,v) and a luminance low frequency band component signal $Y_0$(h,v) in an early field where the position of the focusing lens of the lens system 15 is moved by a distance δ, and a focal point voltage $E_{-1}$(h,v) and a luminance low frequency component signal $Y_{-1}$(h,v) in an early field of the focal point voltage $E_0$(h,v) where the position of the focusing lens of the lens system 15 is moved by a distance δ in accordance with the following equation(25) (steps ST16, ST17B, ST18B, ST19 to ST21).

$$X(h,v) = X - \delta\{\Gamma - \Gamma_{-1}\}/2\{\Gamma - 2\Gamma_c + \Gamma_{-1}\} \quad (25)$$

$$\Gamma_{-1} = E_{-1}(h,v) - Y_{-1}(h,v)$$
$$: \Gamma_0 = E_0(h,v) - Y_0(h,v)$$
$$: \Gamma = E(h,v) - Y(h,v)$$

(X is a present position of the lens)

It is to be noted that in the case where the absolute of the denominator expressed as "$\Gamma' - 2\Gamma'_0 + \Gamma'_{-1}$" is close to zero, the above calculation is not carried out to repeat δ-movement of focusing until the absolute value of the denominator becomes large.

The equation (25) will now be described.

An output DETe(h,v) from the detector 19 for an edge signal in each block is approximately expressed as follows:

$$DETe(h,v) = b \cdot H(h,v) \, EXP\{'\{a \cdot (X - X(h,v)\}^2] \quad (26)$$

A luminance low frequency component signal DETy(h,v) outputted from the detector 29 is expressed by the following equation:

$$DETy(h,v) = C \cdot H(h,v) \quad (27)$$

Further, focal point voltages taken out after undergoing the logarithmic conversion in a present field, an early field, and a field earlier than that are expressed by the following equations (25), (26) and (27), respectively:

$$E(h,v) = \log b + \log\{H(h,v)\} - \{a \cdot (X - X(h,v) + \delta\}^2 \quad (28)$$

$$E_0(h,v) = \log b + \log\{H_0(h,v)\} - \{a \cdot (X - X(h,v)\}^2 \quad (29)$$

$$E_{-1}(h,v) = \log b + \log\{H_{-1}(h,v)\} - \{a \cdot (X - X(h,v) - \delta\}^2 \quad (30)$$

Similarly, luminance low frequency component signals taken out after undergoing the logarithmic conversion in a present field, an early field, and a field earlier than that are expressed by the following equations, respectively:

$$Y(h,v) = \log C + \log\{H(h,v)\} \quad (31)$$

$$Y_0(h,v) = \log C + \log\{H_0(h,v)\} \quad (32)$$

$$Y_{-1}(h,v) = \log C + \log\{H_{-1}(h,v)\} \quad (33)$$

By subtracting the equations (31), (32) and (33) from the equations (28), (29) and (30), respectively, flicker components are eliminated.

Let now consider the case where the characteristics of the logarithmic converter 20 and 30 deviate.

The deviation in the characteristic of the logarithmic converter is expressed below:

$$E(h,v) = \alpha\{X - X(h,v) + \delta\} \quad (28')$$
$$[\log b + \log\{H(h,v)\} - \{a \cdot (X - X(h,v) + \delta\}^2$$

$$E_0(h,v) = \alpha\{X - X(h,v)\} \quad (29')$$
$$[\log b + \log\{H_0(h,v)\} - \{a \cdot (X - X(h,v)\}]$$

$$E_{-1}(h,v) = \alpha(X - X(h,v) - \delta) \quad (30')$$
$$[\log b + \log\{H_{-1}(h,v)\} - \{a \cdot (X - X(h,v) - \delta\}^2]$$

If the function α is substantially constant before and after (X-X(h,v), α is substantially constant before and after {X-X(h,v)}, α is canceled in the process of the equation (25).

Further, the deviation in the characteristic of the logarithmic converter 30 is expressed below:

$$Y(h,v) = \beta\{X - X(h,v) + \delta\} \quad (31')$$
$$[\log C + \log\{H(h,v)\}]$$

$$Y_0(h,v) = \beta\{X - X(h,v)\} \quad (32')$$
$$[\log C + \log\{H_0(h,v)\}]$$

$$Y_{-1}(h,v) = \beta(X - X(h,v) - \delta) \quad (33')$$
$$[\log C + \log\{H_{-1}(h,v)\}]$$

If the function $\beta$ is substantially constant before and after (X-X(h,v)), $\beta$ is canceled in the process of the equation (25).

When the above-mentioned estimated value X(h,v) has been calculated, the control operation proceeds to step ST23 to perform the same operation as that of the previously described fourth embodiment.

Accordingly, in accordance with the fifth embodiment, particularly the in-focus position can be calculated without using the focal point depth information. As a result, the iris encoder 23 and the zoom encoder 24 become unnecessary, and the device can be simplified. In addition, even if the characteristics of the logarithmic converters 20 and 30 deviate due to temperature change, etc., such a deviation is canceled in the process of calculation. Accordingly, there exists a deviation to some extent, the focusing operation is not affected by such a deviation.

It is to be noted that while the logarithmic converter 27 is used as the circuit for converting a high frequency component outputted from the high-pass filter 18 to a signal component having a characteristic opposite to the shading characteristic of the lens, this invention is not limited to such an implementation. For example, there may be employed a circuit to satisfy the following conditions (I) and (II).

Condition (I)

The level E of a high frequency component obtained from the detector 19 can be approximated as follows:

$$E(X) = P \cdot F^{-1}[(X-X(h,v))], \text{ or}$$

$$E(X) = P \cdot F^{-1}[X-X(h,v)]$$

Condition (II)

$$F(\pi g k) = \Sigma r k$$

(P: coefficient, g: factor)

Further, while there is employed a structure to move the lens system 15, there may be employed a structure to move the imaging element 16.

Furthermore, while two logarithmic converters 20 and 30 are used in the fourth and fifth embodiments, a single logarithmic converter may be commonly used. In such a case, it is sufficient to provide a switch at the preceding stage of the logarithmic converter.

In addition, while it has been described in the fourth and fifth embodiments that the area within the imaging frame is divided into a plurality of blocks, if there is employed, e.g., a structure such that the distance measurement window is arbitrarily moved, this invention may be implemented in the same manner.

What is claimed is:

1. An automatic focusing imaging device comprising:
   an imaging element for forming an image of an image pick-up light from an object through a lens system to apply photoelectric conversion to said image pick-up light at a photoelectric conversion surface provided on said imaging element to provide video signal, said imaging element and said lens system defining the elements of an optical pair
   a camera circuit for processing said video signal subjected to photoelectric conversion by said imaging element to generate a luminance signal, said camera circuit utilizing one of a plurality of processing techniques signal including filtering and blanking;
   filter means for extracting, as an analog signal, a high frequency band component of said video signal, said filter means comprising a high-pass filter for extracting an edge signal corresponding to said high frequency band component;
   a detector for detecting said edge signal extracted by said high-pass filter to output a detected signal;
   a logarithmic converter for applying logarithmic conversion to said detected signal from said detector to provide a focal point voltage having a predetermined characteristic;
   an analog/digital converter for converting said focal point voltage to data in the form of a digital signal;
   calculation means for calculating in advance an in-focus position of at least one element from said optical pair which includes said lens system and said imaging element where said high frequency band component takes a maximum level to generate a control signal, said calculation means comprising a microcomputer responsive to said in-focus position to generate said control signal;
   a lens drive mechanism responsive to said control signal to move said at least one element from said optical pair which includes said imaging element; and
   non-linear conversion means being provided at the preceding stage of said analog-digital converter, and for correcting in advance deterioration of the quantization resolution of said high frequency band component quantized at the time of calculation of the in-focus position of said at least one element from said optical pair;
   and wherein said microcomputer includes means for dividing a screen captured by said imaging element into a plurality of blocks to extract for each of said blocks a high frequency band component to determine high frequency component information corresponding to each of said blocks to calculate an in-focus value for each of said blocks to determine an in-focus value for the entire screen by using calculated results for each block to generate said control signal for carrying out focusing using said lens drive mechanism.

2. An automatic focusing imaging device as set forth in claim 1, wherein said imaging device comprises second filter means for extracting, as a second analog signal, a low frequency component from said video signal outputted from said imaging element, and means for inputting a high frequency component analog signal extracted by said filter means and a second analog signal with respect to a low frequency component extracted by said second filter means to carry out calculation thereof, thus to provide high frequency component information from which a flicker component is eliminated.

3. An automatic focusing imaging device as set forth in claim 2, wherein said imaging device comprises a second detector for detecting low frequency component extracted by said second filter means, a second logarithmic converter for applying logarithmic conversion to output from said second detector, a switch for carrying out switching between a focal point voltage signal and a luminance low frequency signal outputted from said respective logarithmic converters in response to a switching control signal outputted from said calculation means, said A/D converter converting either one of analog signals switched by said switch to a digital signal, said calculation means responsive to output data as said digital signal outputted from said A/D converter to output said switching control signal to said switch, and to output a lens drive signal as said control signal.

4. An automatic focusing imaging device as set forth in claim 3, wherein said imaging device further comprises detection means for detecting focal depth information of said lens system to output it, said calculation means being operative to respond to said detected focal depth information to calculate an in-focus value indicating the state where said lens system is in focus.

5. An automatic focusing imaging device as set forth in claim 4, wherein said detection means is comprised of an iris encoder and a zoom encoder provided in said lens system, and for detecting said focal depth information to deliver it to said calculation means.

6. An automatic focusing imaging device as set forth in claim 1, wherein said imaging device comprises detection means for detecting said focal depth information of said lens system to output it, and said calculation means responsive to said focal depth information detected by said detection means to calculate an in-focus value showing the state where said lens system is in focus.

7. The automatic focusing imaging device according to claim 1, wherein said imaging device further comprises a zoom encoder and an iris encoder for detecting a focal length and an entrance pupil of said lens system to deliver said focal length and said entrance pupil to said microcomputer in order to give focal depth information of an object to said microcomputer.

8. The automatic focusing imaging device according to claim 1, wherein said microcomputer determines an in-focus point by using a predetermined calculation formula on the basis of a first focal point voltage in a predetermined specific field, a second focal point voltage in a field after the position of a focusing lens of said lens system is moved by a predetermined distance, and a third focal point voltage in a field after the position of said focusing lens is further moved by said predetermined distance to thereby provide focal depth information of said lens system.

9. An automatic focusing imaging device comprising:
an imaging element for forming an image of an image pick-up light from an object through a lens system to apply photoelectric conversion to said image pick-up light at a photoelectric conversion surface provided on said imaging element to provide a video signal, said imaging element and said lens system defining the elements of an optical pair;

a camera circuit for processing said video signal subjected to photoelectric conversion by said imaging element to generate a luminance signal, said camera circuit utilizing one of a plurality of processing techniques including filtering and blanking;

filter means for extracting, as an analog signal, a high frequency band component of said video signal, said filter means comprising a high-pass filter for extracting an edge signal corresponding to said high frequency band component;

a detector for detecting said edge signal extracted by said high-pass filter to output a detected signal;

a logarithmic converter for applying logarithmic conversion to said detected signal from said detector to provide a focal point voltage having a predetermined characteristic;

an analog/digital converter for converting said focal point voltage to data in the form of a digital signal;

calculation means for calculating in advance an in-focus position for at least one of the elements from said optical pair which includes said lens system and said imaging element where said high frequency band component takes a maximum level to generate a control signal, said calculation means being responsive to said in-focus position to generate said control signal, said calculation means comprising a microcomputer having means for dividing a screen captured by said imaging element into a plurality of blocks to extract for each of said blocks a high frequency band component to determine high frequency component information corresponding to each of said blocks to calculate an in-focus value for each of said blocks to determine an in-focus value for the entire screen by using calculated results for each block to generate said control signal for carrying out focusing;

a lens drive mechanism responsive to said control signal for carrying out focusing by moving said at least one element of said optical pair;

non-linear conversion means provided at the preceding stage of said analog/digital converter, and for correcting in advance deterioration of the quantization resolution of said high frequency band component quantized at the time of calculation of the in-focus position of said at least one element from said optical pair;

detection means for detecting focal depth information from said lens system to output said information;

and wherein said microcomputer is responsive to said focal depth information detected by said detection means to calculate said in-focus value indicative of the state where said lens system is in focus.

* * * * *